United States Patent
Sakurai et al.

(10) Patent No.: US 9,494,097 B2
(45) Date of Patent: Nov. 15, 2016

(54) EXHAUST PURIFICATION SYSTEM OF SPARK IGNITION TYPE INTERNAL COMBUSTION ENGINE

(75) Inventors: Kenji Sakurai, Gotenba (JP); Kohki Nakamura, Ebina (JP);
(Continued)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/234,015

(22) PCT Filed: Aug. 28, 2012

(86) PCT No.: PCT/JP2012/071705
§ 371 (c)(1),
(2), (4) Date: Jan. 21, 2014

(87) PCT Pub. No.: WO2014/033838
PCT Pub. Date: Mar. 6, 2014

(65) Prior Publication Data
US 2015/0204261 A1  Jul. 23, 2015

(51) Int. Cl.
*F01N 3/00* (2006.01)
*F02D 41/14* (2006.01)
(Continued)

(52) U.S. Cl.
CPC ......... *F02D 41/1475* (2013.01); *F01N 3/0814* (2013.01); *F01N 3/0842* (2013.01);
(Continued)

(58) Field of Classification Search
CPC .................. F01N 3/0842; F01N 13/02; F02D 41/0275; F02D 41/1441; F02D 41/0295
(Continued)

(56) References Cited

U.S. PATENT DOCUMENTS 6,467,258 B1 * 10/2002 Jobson ............... B01D 53/9495
60/274
6,732,507 B1 * 5/2004 Stanglmaier ........... F01N 3/035
60/280

(Continued)

FOREIGN PATENT DOCUMENTS

JP   A-06-190245   7/1994
JP   A-2008-286102  11/2008
WO  WO 2011061820 A1 * 5/2011

OTHER PUBLICATIONS

Machine Translation of WO-2011061820A1, Translated on Jun. 16, 2015.*

*Primary Examiner* — Patrick Maines
(74) *Attorney, Agent, or Firm* — Oliff PLC

(57) ABSTRACT

The $NO_x$ storage catalyst and the $NO_x$ selective reduction catalyst are arranged in the engine exhaust passage. In the engine low load operating region, a combustion is performed in the combustion chamber under a lean base air-fuel ratio and the air-fuel ratio in the combustion chamber is made rich when $NO_x$ should be released from the $NO_x$ storage catalyst. In the engine medium load operating region, the base air-fuel ratio is made smaller, a degree of richness of the air-fuel ratio is made smaller, and a period in which the air-fuel ratio is made rich is made shorter so that an amount of ammonia which is produced per unit time when the air-fuel ratio is made rich falls compared with the time of engine low load operation.

3 Claims, 15 Drawing Sheets

(75) Inventors: Shigeki Nakayama, Gotenba (JP);
Kohei Yoshida, Gotenba (JP); Yuki Bisaiji, Susono (JP)

(51) Int. Cl.
*F02D 41/02* (2006.01)
*F01N 3/08* (2006.01)
*F01N 3/20* (2006.01)
*F01N 9/00* (2006.01)

(52) U.S. Cl.
CPC .............. *F01N 3/208* (2013.01); *F01N 3/2066* (2013.01); *F01N 9/00* (2013.01); *F02D 41/0235* (2013.01); *F02D 41/0275* (2013.01); *F02D 41/146* (2013.01); *F01N 2430/06* (2013.01); *F02D 41/1456* (2013.01); *F02D 2200/0806* (2013.01); *Y02T 10/22* (2013.01); *Y02T 10/24* (2013.01); *Y02T 10/47* (2013.01)

(58) Field of Classification Search
USPC ................... 60/273, 274, 285, 286, 295, 301
See application file for complete search history.

(56) References Cited

U.S. PATENT DOCUMENTS

| | | | |
|---|---|---|---|
| 2001/0015066 A1* | 8/2001 | Takaku et al. .................. | 60/285 |
| 2003/0115858 A1* | 6/2003 | Hahn ................ | B01D 53/0454 |
| | | | 60/295 |
| 2004/0123585 A1* | 7/2004 | Yamaguchi et al. ............ | 60/274 |
| 2008/0202098 A1* | 8/2008 | Fisher et al. .................... | 60/285 |
| 2010/0115926 A1* | 5/2010 | Nagaoka et al. ............... | 60/286 |
| 2011/0252766 A1 | 10/2011 | Ramanathan et al. | |
| 2012/0192549 A1 | 8/2012 | Sakurai | |

* cited by examiner

EXHAUST PURIFICATION SYSTEM OF SPARK IGNITION TYPE INTERNAL COMBUSTION ENGINE

TECHNICAL FIELD

The present invention relates to an exhaust purification system of a spark ignition type internal combustion engine.

BACKGROUND ART

Known in the art is a diesel engine which arranges in an engine exhaust passage an $NO_x$ storage catalyst which stores $NO_x$ in exhaust gas when the air-fuel ratio of the inflowing exhaust gas is lean and releases the stored $NO_x$ when the air-fuel ratio of the inflowing exhaust gas is made rich, arranges downstream of the $NO_x$ storage catalyst in the engine exhaust passage an $NO_x$ selective reduction catalyst, makes the ammonia which is produced at the $NO_x$ storage catalyst when the exhaust gas which flows into the $NO_x$ storage catalyst is made rich be adsorbed at the $NO_x$ selective reduction catalyst, and reduce the $NO_x$ which is contained in the exhaust gas by the adsorbed ammonia (for example, see Patent Literature 1).

In this diesel engine, the amount of ammonia which is adsorbed at the $NO_x$ selective reduction catalyst is controlled to become the optimum amount for reduction of the $NO_x$. However, the method of adsorption of ammonia includes a method of adsorption where the adsorbed ammonia is easily desorbed and a method of adsorption where the adsorbed ammonia is hard to desorb, that is, two methods of adsorption. When using the method of adsorption where the ammonia is easily desorbed, it is possible to easily reduce the $NO_x$ by the adsorbed ammonia, but when using the method of adsorption where the adsorbed ammonia is hard to desorb, it is impossible to easily reduce the $NO_x$ by the adsorbed ammonia. Therefore, when using the adsorbed ammonia to reduce the $NO_x$, it is necessary to consider the method of adsorption of the ammonia.

CITATIONS LIST

Patent Literature

Patent Literature 1: Japanese Patent Publication No. 2008-286102A

SUMMARY OF INVENTION

Technical Problem

However, in the above-mentioned diesel engine, the method of adsorption of ammonia is not considered. Therefore, there is the problem that it is not possible to use the adsorbed ammonia to suitably reduce the $NO_x$.

The object of the present invention is to provide an exhaust purification system of a spark ignition type internal combustion engine which uses the absorbed ammonia to reduce the amount of fuel consumption while reducing the $NO_x$ well.

Solution to Problem

According to the present invention, there is provided an exhaust purification system of a spark ignition type internal combustion engine in which an $NO_x$ storage catalyst storing $NO_x$ in exhaust gas when an air-fuel ratio of an inflowing exhaust gas is lean and releasing stored $NO_x$ when the air-fuel ratio of the inflowing exhaust gas is made rich is arranged in an engine exhaust passage, an $NO_x$ selective reduction catalyst is arranged in the engine exhaust passage downstream of the $NO_x$ storage catalyst, an ammonia which is produced at the $NO_x$ storage catalyst when the air-fuel ratio of the inflowing exhaust gas is made rich is adsorbed at the $NO_x$ selective reduction catalyst, and $NO_x$ in the exhaust gas is reduced by the ammonia which is adsorbed at the $NO_x$ selective reduction catalyst, wherein at the time of engine low load operation, a combustion is performed in a combustion chamber under a lean base air-fuel ratio and the air-fuel ratio in the combustion chamber is made rich when $NO_x$ should be released from the $NO_x$ storage catalyst, and when an engine load becomes higher compared with the time of engine low load operation, the base air-fuel ratio is made smaller, a degree of richness of the air-fuel ratio is made smaller, and a period in which the air-fuel ratio is made rich is made shorter so that an amount of ammonia which is produced per unit time when the air-fuel ratio is made rich falls compared with the time of engine low load operation.

Advantageous Effects of Invention

It is possible to use the adsorbed ammonia to reduce the amount of fuel consumption while removing $NO_x$ well.

DESCRIPTION OF EMBODIMENTS

Figure 1:
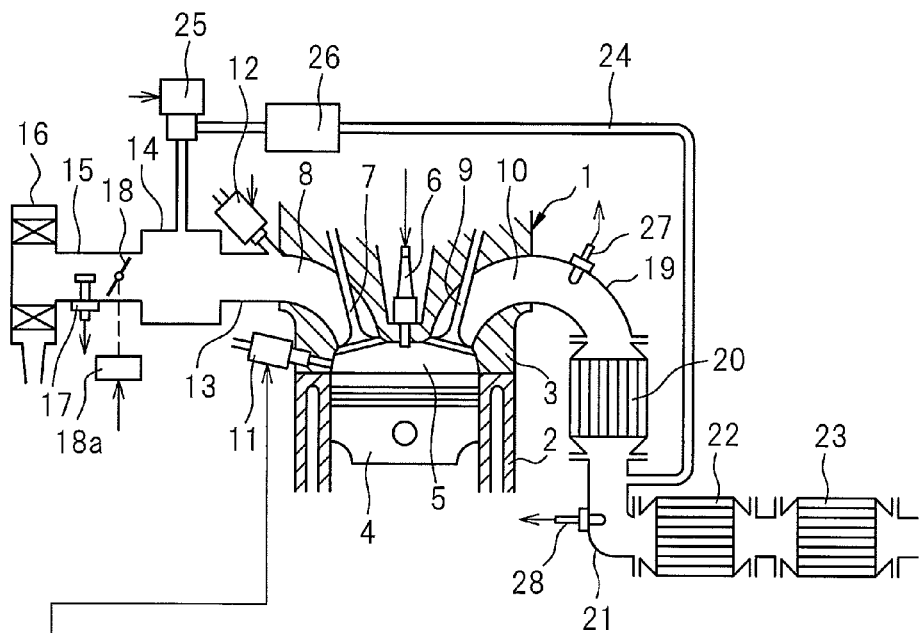
FIG. 1 is an overall view of a spark ignition type internal combustion engine.
Figure 1:
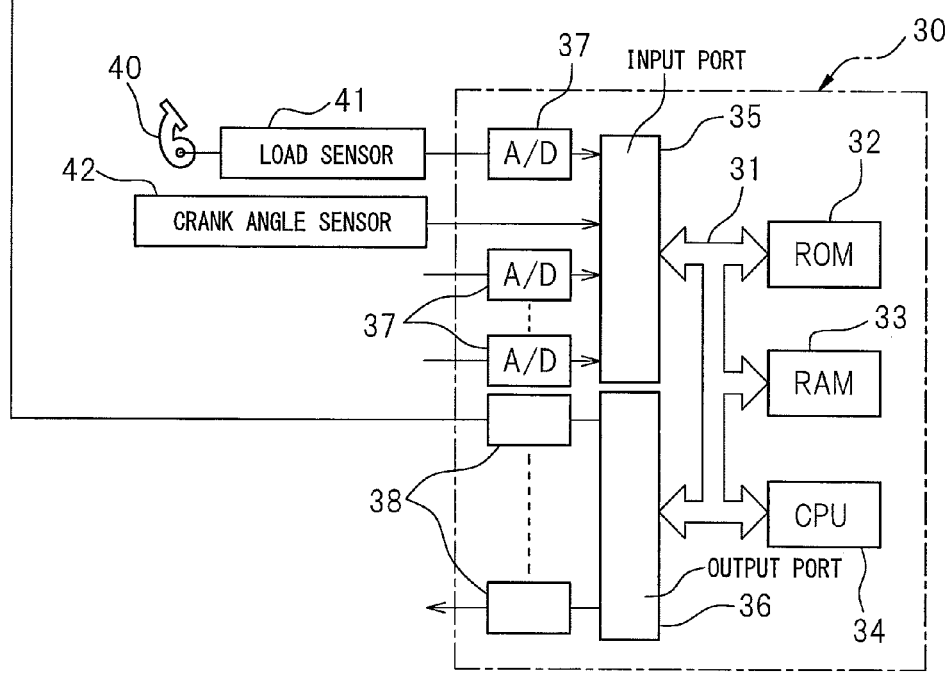

FIG. 1 is an overall view of a spark ignition type internal combustion engine.

Referring to FIG. 1, 1 indicates an engine body, 2 a cylinder block, 3 a cylinder head, 4 a piston, 5 a combustion chamber, 6 a spark plug, 7 an intake valve, 8 an intake port, 9 an exhaust valve, and 10 an exhaust port. As shown in FIG. 1, each cylinder is provided with a pair of fuel injectors which are comprised of an electronic control type fuel injector 11 for injecting fuel toward the inside of the combustion chamber 2 and an electronic control type fuel injector 12 for injecting fuel toward the inside of the intake port 8. The intake port 8 of each cylinder is connected through an intake branch pipe 13 to a surge tank 14. The surge tank 14 is connected through an intake duct 15 to an air cleaner 16. Inside of the intake duct 15, an intake air amount detector 17 and a throttle valve 18 which is driven by an actuator 18a are arranged.

On the other hand, the exhaust port 10 of each cylinder is connected through an exhaust manifold 19 to the inlet of a three-way catalyst 20 while the outlet of the three-way catalyst 20 is connected through an exhaust pipe 21 to the inlet of an $NO_x$ storage catalyst 22. The outlet of the $NO_x$ storage catalyst 22 is connected to an $NO_x$ selective reduction catalyst 23. On the other hand, the exhaust pipe 21 and the surge tank 14 are connected through an exhaust gas recirculation (below, called "EGR") passage 24 to each other. Inside of the EGR passage 24, an electronic control type EGR control valve 25 is arranged. Furthermore, a cooling device 26 is arranged around the EGR passage 24 for cooling the exhaust gas which flows through the inside of the EGR passage 24. In the embodiment which is shown in FIG. 1, the engine cooling water is introduced into the cooling device 26 and the engine cooling water is used to cool the exhaust gas.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Upstream of the three-way catalyst 20, an air-fuel ratio sensor 27 is attached for detecting the air-fuel ratio of the exhaust gas which is exhausted from the engine. Downstream of the three-way catalyst 20, an oxygen concentration sensor 28 is attached for detecting the oxygen concentration of the exhaust gas. The output signals of these air-fuel ratio sensor 27, oxygen concentration sensor 28, and intake air amount detector 17 are input through the corresponding AD converters 37 to the input port 35. Further, a load sensor 41 generating an output voltage which is proportional to the amount of depression of an accelerator pedal 40 is connected to the accelerator pedal 40. The output voltage of the load sensor 41 is input through the corresponding AD converter 37 to the input port 35. Furthermore, a crank angle sensor 42 generating an output pulse each time the crank shaft rotates by for example 30° is connected to the input port 35. On the other hand, the output port 36 is connected through the corresponding derive circuits 38 to the spark plugs 6, fuel injectors 11, 12, throttle valve drive actuator 18a, and EGR control valve 25.

Figure 2:
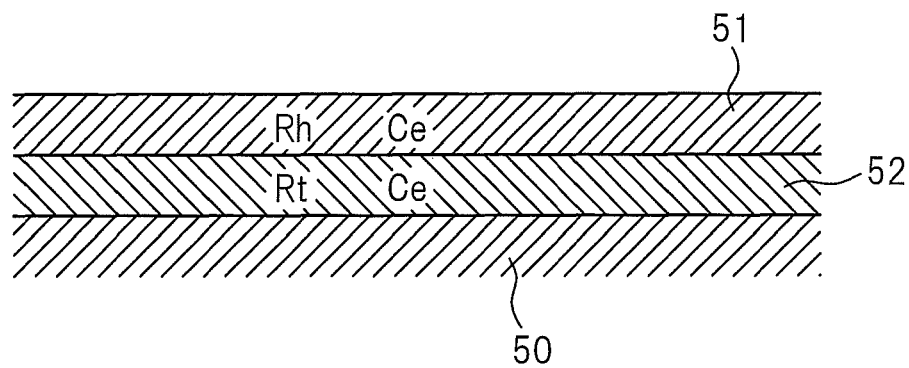
FIG. 2 is a view which schematically shows a surface part of a substrate of a three-way catalyst.

FIG. 2 schematically shows the surface part of a substrate of the three-way catalyst 20. As shown in FIG. 2, on the catalyst carrier 50, a top coat layer 51 and a bottom coat layer 52 are formed in a laminated state. The top coat layer 51 is comprised of rhodium Rh and cerium Ce, while the bottom coat layer 52 is comprised of platinum Pt and cerium Ce. Note that, in this case, the amount of cerium Ce which is contained in the top coat layer 51 is smaller than the amount of cerium Ce which is contained in the bottom coat layer 52. Further, the top coat layer 51 can be made to include zirconium Zr in it, while the bottom coat layer 52 can be made to include palladium Pd.

This three-way catalyst 20 has the function of simultaneously reducing the harmful ingredients HC, CO, and $NO_x$ which are contained in exhaust gas when fuel is burned in the combustion chamber 5 under the stoichiometric air-fuel ratio, that is, when the air-fuel ratio of the exhaust gas which is exhausted from the engine is the stoichiometric air-fuel ratio. Therefore, when fuel is burned in the combustion chamber 5 under the stoichiometric air-fuel ratio, the harmful ingredients HC, CO, and $NO_x$ which are contained in the exhaust gas are removed in the three-way catalyst 20.

Note that, it is impossible to continue to hold the air-fuel ratio in the combustion chamber 5 completely at the stoichiometric air-fuel ratio. Therefore, in practice, the amounts of injection from the fuel injectors 11 and 12 are feedback controlled based on the detection signal of the air-fuel ratio sensor 27 so that the air-fuel ratio of the exhaust gas exhausted from the combustion chamber 5 is made to become substantially the stoichiometric air-fuel ratio, that is, the air-fuel ratio of the exhaust gas exhausted from the combustion chamber 5 is made to vibrate about the stoichiometric air-fuel ratio. Further, in this case, when the center of fluctuation of the air-fuel ratio of the exhaust gas is off from the stoichiometric air-fuel ratio, the air-fuel ratio of the exhaust gas is adjusted based on the output signal of the oxygen concentration sensor 28 so that the center of fluctuation of the air-fuel ratio of the exhaust gas returns to the stoichiometric air-fuel ratio. In this way, even if the air-fuel ratio of the exhaust gas exhausted from the combustion chamber 5 vibrates about the stoichiometric air-fuel ratio, the oxygen storage ability of the three-way catalyst 20 due to cerium Ce enables the harmful ingredients HC, CO, and $NO_x$ which are contained in the exhaust gas to be removed well at the three-way catalyst 20.

Figure 3A:
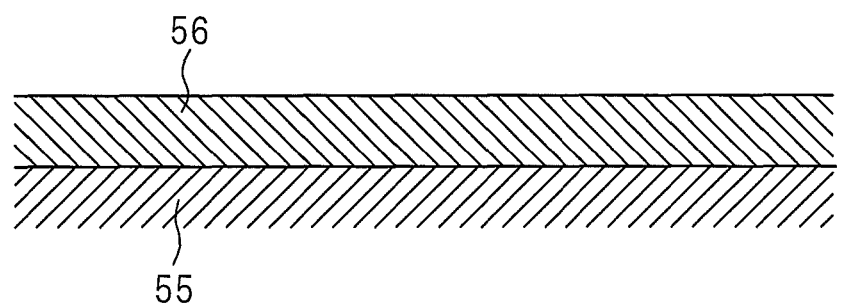
FIGS. 3A and 3B are views schematically showing a surface part etc. of a catalyst carrier of an $NO_x$ storage catalyst.
Figure 3B:
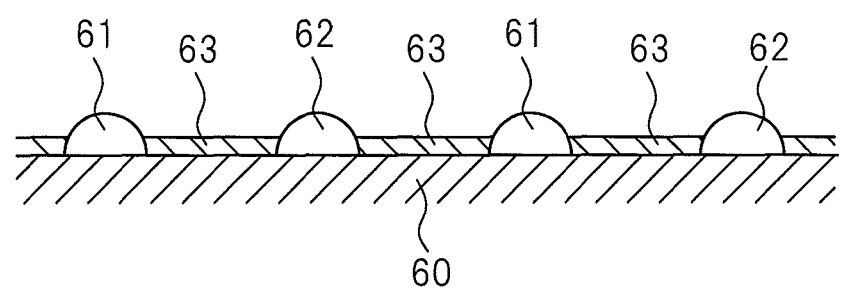

FIG. 3A schematically shows the surface part of the substrate 55 of the $NO_x$ storage catalyst 22. As shown in FIG. 3A, in the $NO_x$ storage catalyst 22 as well, a coat layer 56 is formed on the substrate 55. This coat layer 56 is comprised of for example an aggregate of powder. FIG. 3B shows an enlarged view of this powder. If referring to FIG. 3B, a catalyst carrier 60 which is comprised of this powder, for example, alumina, carries precious metal catalysts 61 and 62. Furthermore, this catalyst carrier 60 is formed with a basicity layer 63 which includes at least one element selected from potassium K, sodium Na, cesium Cs, and other such alkali metals, barium Ba, calcium Ca, and other such alkali earth metals, lanthanoids and other such rare earths and silver Ag, copper Cu, iron Fe, iridium Ir, and other such metals which donate electrons to $NO_x$.

On the other hand, in FIG. 3B, the precious metal catalyst 61 is comprised of platinum Pt, while the precious metal catalyst 62 is comprised of rhodium Rh. Note that in this case, either of the precious metal catalysts 61 and 62 may also be comprised from platinum Pt. Further, the catalyst carrier 60 can carry on it not only platinum Pt and rhodium Rh but also palladium Pd or can carry on it, instead of rhodium Rh, palladium Pd. That is, the precious metal catalysts 61 and 62 which are carried on the catalyst carrier 60 are comprised of at least one of platinum Pt, rhodium Rh, and palladium Pd.

Next, the action of adsorption and release of $NO_x$ by the $NO_x$ storage catalyst 22 will be explained with reference to FIGS. 4A and 4B which are enlarged views of FIG. 3B.

Now, when fuel is burned under a lean air-fuel ratio, that is, when the air-fuel ratio of the exhaust gas is lean, the oxygen concentration of the exhaust gas is high. Therefore, at this time, the NO which is contained in the exhaust gas, as shown in FIG. 4A, is oxidized on the platinum Pt 61 to become $NO_2$. Next, it is absorbed in the basicity layer 63 to diffuse in the form of nitric acid ions $NO_3^-$ inside the basicity layer 63 and become nitrates. In this way, the $NO_x$ in the exhaust gas is absorbed in the form of nitrates in the basicity layer 63. So long as the oxygen concentration of the exhaust gas is high, $NO_2$ is formed on the surface 61 of the platinum Pt. So long as the $NO_x$ absorption ability of the basicity layer 63 is not saturated, the $NO_x$ is absorbed in the basicity layer 63 and nitrates are formed.

Figure 4A:
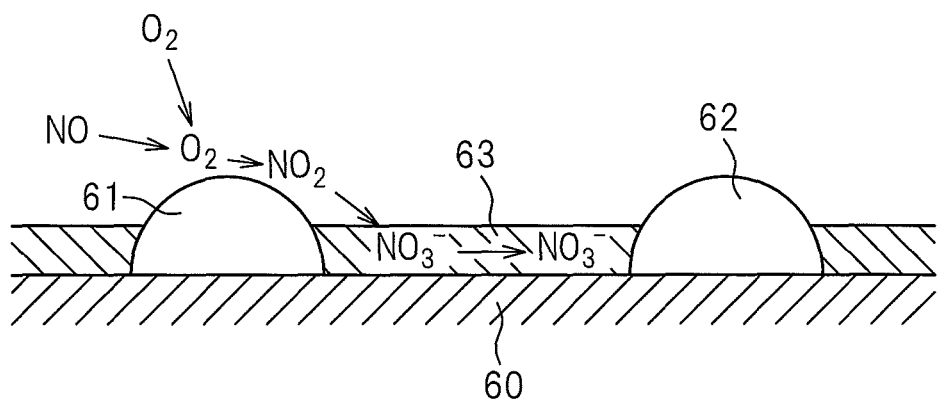
FIGS. 4A and 4B are views for explaining an oxidation reduction reaction in an $NO_x$ storage catalyst.
Figure 4B:
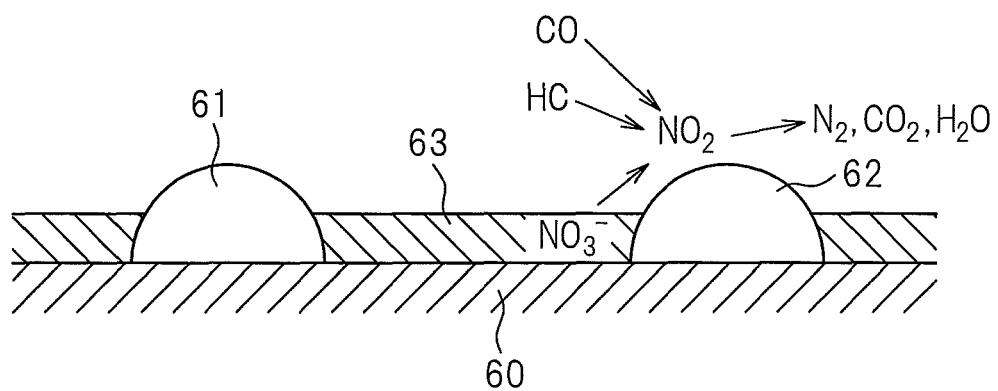

As opposed to this, if the air-fuel ratio in the combustion chamber 5 is made rich, the oxygen concentration of the exhaust gas which flows into the $NO_x$ storage catalyst 22 falls, so the reaction proceeds in the opposite direction ($NO_3^- \rightarrow NO_2$) and therefore nitrates which are absorbed in the basicity layer 63 successively become nitric acid ions $NO_3^-$ and, as shown in FIG. 4B, are released in the form of $NO_2$ from the basicity layer 63. Next, the released $NO_2$ is reduced by the hydrocarbons HC and CO which are contained in the exhaust gas.

Note that, when fuel is burned in a lean air-fuel ratio, that is, when the air-fuel ratio of the exhaust gas is lean, NO is adsorbed at the surface 61 of the platinum Pt. Therefore, the NO in the exhaust gas is held at the $NO_x$ storage catalyst 22 by this adsorption action as well. The NO which is adsorbed at the surface 61 of the platinum Pt is desorbed from the surface 61 of the platinum PT if air-fuel ratio in the combustion chamber 5 is made rich. Therefore, if using the term "storage" as the term including both absorption and adsorption, the basicity layer 63 plays the role of an $NO_x$ storage agent for temporarily storing the $NO_x$. Therefore, if referring to the ratio of the air and fuel (hydrocarbons) which are fed into the engine intake passage, combustion chambers 5, and exhaust passage upstream of the $NO_x$ storage catalyst 22 as referred to as the "air-fuel ratio of the exhaust gas", the $NO_x$ storage catalyst 22 stores $NO_x$ when the air-fuel ratio of the exhaust gas which flows into the $NO_x$ storage catalyst 22 is lean and releases the stored $NO_x$ when the air-fuel ratio of the exhaust gas which flows into the $NO_x$ storage catalyst 22 becomes rich.

When the air-fuel ratio of the exhaust gas is lean in this way, that is, when the fuel is burned under a lean air-fuel ratio, the $NO_x$ in the exhaust gas is stored in the $NO_x$ storage catalyst 22. However, if fuel continues to be burned under a lean air-fuel ratio, during that time, the $NO_x$ storage ability of the $NO_x$ storage catalyst 22 will end up being saturated. As a result, the $NO_x$ storage catalyst 22 will no longer be able to store $NO_x$. Therefore, before the $NO_x$ storage catalyst 22 becomes saturated in $NO_x$ storage ability, the air-fuel ratio in the combustion chamber 5 is made temporarily rich and thereby the $NO_x$ storage catalyst 22 is made to release $NO_x$.

Figure 5:
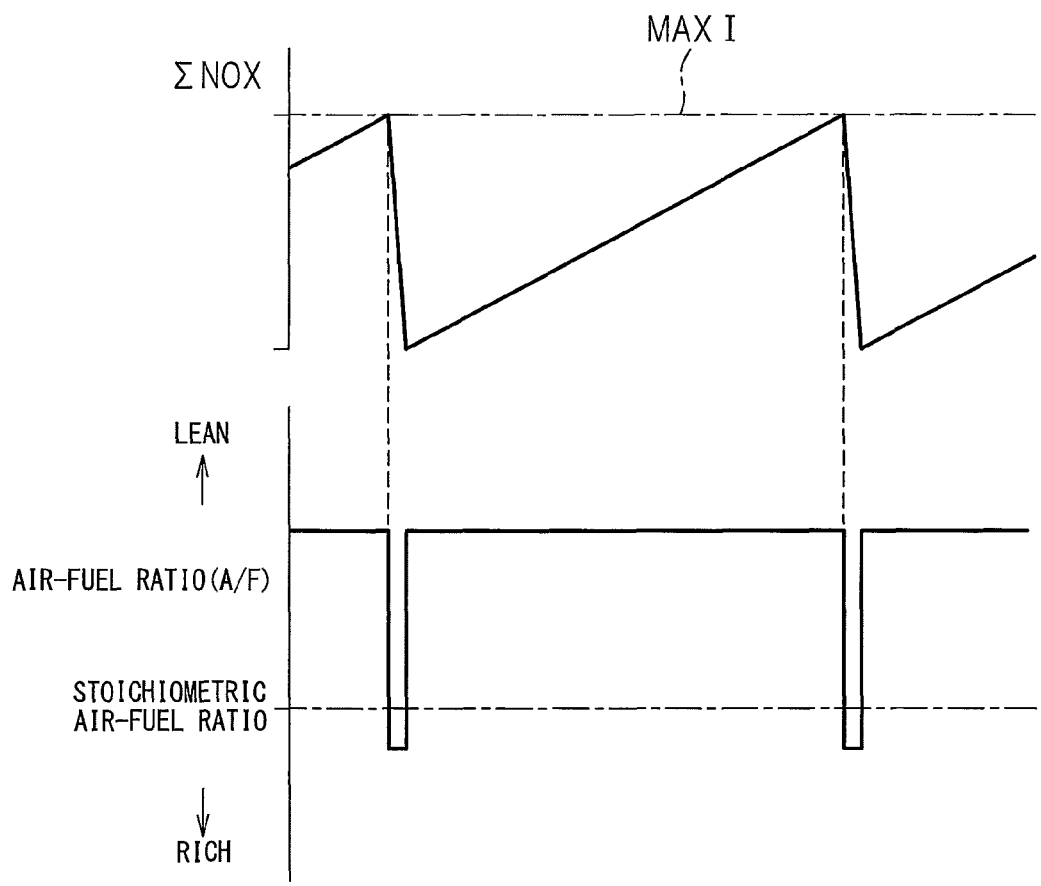
FIG. 5 is a view which shows $NO_x$ release control.

FIG. 5 shows the control for release of $NO_x$ from the $NO_x$ storage catalyst 22 which is used in the embodiment according to the present invention. If referring to FIG. 5, in this embodiment according to the present invention, the air-fuel ratio (A/F) in the combustion chamber 5 is temporarily made rich when the stored $NO_x$ amount $\Sigma NOX$ which is stored in the $NO_x$ storage catalyst 22 exceeds the predetermined first allowable $NO_x$ storage amount MAXI. If the air-fuel ratio (A/F) in the combustion chamber 5 is made rich, that is, if the air-fuel ratio of the exhaust gas which flows into the $NO_x$ storage catalyst 22 is made rich, the $NO_x$ which was stored in the $NO_x$ storage catalyst 22 when the fuel was burned under a lean air-fuel ratio, is released all at once from the $NO_x$ storage catalyst 22 and reduced. Due to this, the $NO_x$ is removed.

Figure 6:
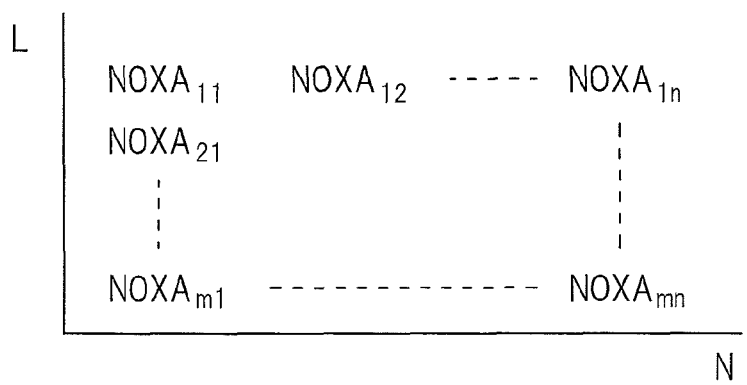
FIG. 6 is a view which shows a map of an exhausted $NO_x$ amount NOXA.

The stored $NO_x$ amount $\Sigma NOX$ is for example calculated from the amount of $NO_x$ which is exhausted from the engine. In this embodiment according to the present invention, the exhausted $NO_x$ amount NOXA which is exhausted from the engine per unit time is stored as a function of the demanded load L and engine speed N in the form of a map such as shown in FIG. 6 in advance in the ROM 32. From this exhausted $NO_x$ amount NOXA, the stored $NO_x$ amount $\Sigma NOX$ is calculated. In this case, the period by which the air-fuel ratio in the combustion chamber 5 is made rich is usually 1 minute or more.

Figure 7:
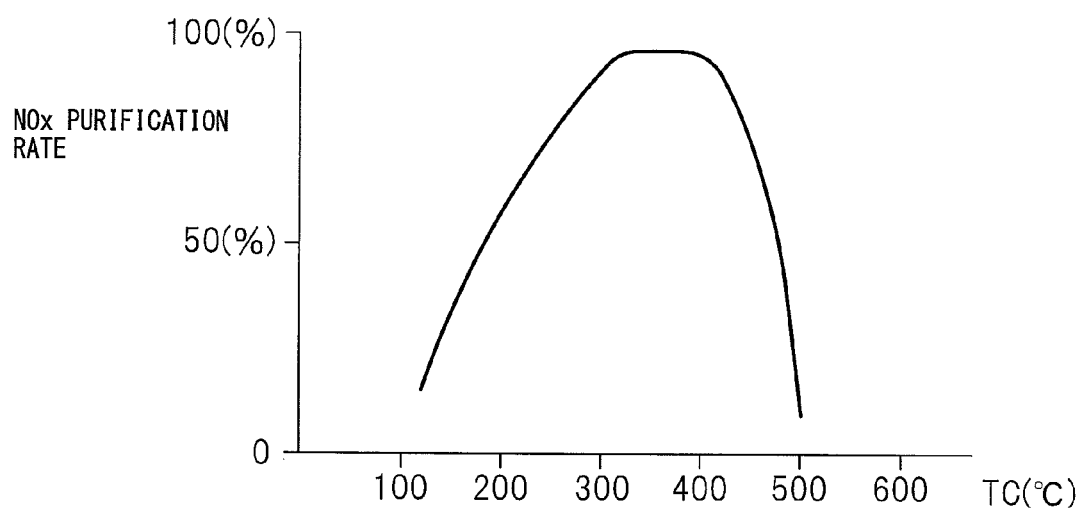
FIG. 7 is a view showing an $NO_x$ purification rate.

FIG. 7 shows the $NO_x$ purification rate when using the $NO_x$ storage and release action of the $NO_x$ storage catalyst 22 such as shown in FIG. 5 so as to remove the $NO_x$. Note that, in FIG. 7, the abscissa shows the catalyst temperature TC of the $NO_x$ storage catalyst 22. In this case, as will be understood from FIG. 7, when the catalyst temperature TC is 300° C. to 400° C., an extremely high $NO_x$ purification rate is obtained, but if the catalyst temperature TC becomes a 400° C. or higher temperature, the $NO_x$ purification rate falls. If the catalyst temperature TC becomes 400° C. or more in this way, the $NO_x$ purification rate falls since if the catalyst temperature TC becomes 400° C. or more, $NO_x$ becomes harder to store and, further, the nitrates break down under heat and are released in the form of $NO_2$ from the $NO_x$ storage catalyst 22. That is, so long as storing $NO_x$ in the form of nitrates, obtaining a high $NO_x$ purification rate is difficult when the catalyst temperature TC is high.

In this regard, when fuel is burned under a lean air-fuel ratio, the fuel consumption becomes smaller compared with when fuel is burned under the stoichiometric air-fuel ratio. Therefore, to reduce the fuel consumption, as much as possible, it is preferable to burn fuel under a lean air-fuel ratio. However, as will be understood from FIG. 7, if the temperature TC of the $NO_x$ storage catalyst 22 becomes higher, the $NO_x$ purification rate falls. As opposed to this, when fuel is burned under the stoichiometric air-fuel ratio, even if the temperature TC of the three-way catalyst 20 becomes high, the $NO_x$ purification rate does not fall. Therefore, conventionally, fuel is burned under a lean air-fuel ratio at the time of engine low load operation where the temperature TC of the $NO_x$ storage catalyst 22 is low, and fuel is burned under the stoichiometric air-fuel ratio at the time of engine high load operation where the temperature TC of the $NO_x$ storage catalyst 22 becomes higher.

Now, as stated above, if the air-fuel ratio of the exhaust gas which flows into the $NO_x$ storage catalyst 22 is made rich, $NO_x$ is released from the $NO_x$ storage catalyst 22. At this time, the majority of the $NO_x$ which is released from the $NO_x$ storage catalyst 22 becomes $N_2$, but part of the $NO_x$ reacts with the hydrocarbons contained in the exhaust gas or the hydrogen produced by a heat decomposition action of water and becomes ammonia. On the other hand, as shown in FIG. 1, in the present invention, the $NO_x$ selective reduction catalyst 23 which is comprised of zeolite and can adsorb ammonia is arranged downstream of the $NO_x$ storage catalyst 22 and therefore the ammonia which is produced at the $NO_x$ storage catalyst 22 is adsorbed at the $NO_x$ selective reduction catalyst 23. In this case, the $NO_x$ which flows out from the $NO_x$ storage catalyst 22 is reduced by the ammonia which is adsorbed at the $NO_x$ selective reduction catalyst 23. That is, in the present invention, when the air-fuel ratio of the exhaust gas which flows into the $NO_x$ storage catalyst 22 is maintained lean, the $NO_x$ contained in the exhaust gas is stored in the $NO_x$ storage catalyst 22, and the $NO_x$ which is not stored at this time is reduced by the ammonia which is adsorbed at the $NO_x$ selective reduction catalyst 23.

In this regard, as explained at the start, the method of adsorption of ammonia at the $NO_x$ selective reduction catalyst 23 includes a method of adsorption where the adsorbed ammonia is easily desorbed and a method of adsorption where the adsorbed ammonia is hard to desorb, that is, two methods of adsorption. When using the method of adsorption where the ammonia is easily desorbed, it is possible to easily reduce the $NO_x$ by the adsorbed ammonia, but when using the method of adsorption where the adsorbed ammonia is hard to desorb, it is impossible to easily reduce the $NO_x$ by the adsorbed ammonia. Therefore, when using the adsorbed ammonia to reduce the $NO_x$, it is necessary to consider the method of adsorption of the ammonia. Thus, next, the method of adsorption of ammonia will be explained while referring to FIG. 8 which shows the relationship between the amount of ammonia desorbed from the $NO_x$ selective reduction catalyst 23 and the temperature TB of the $NO_x$ selective reduction catalyst 23 and FIGS. 9A and 9B which schematically show the structure of the $NO_x$ selective reduction catalyst 23.

Figure 8:
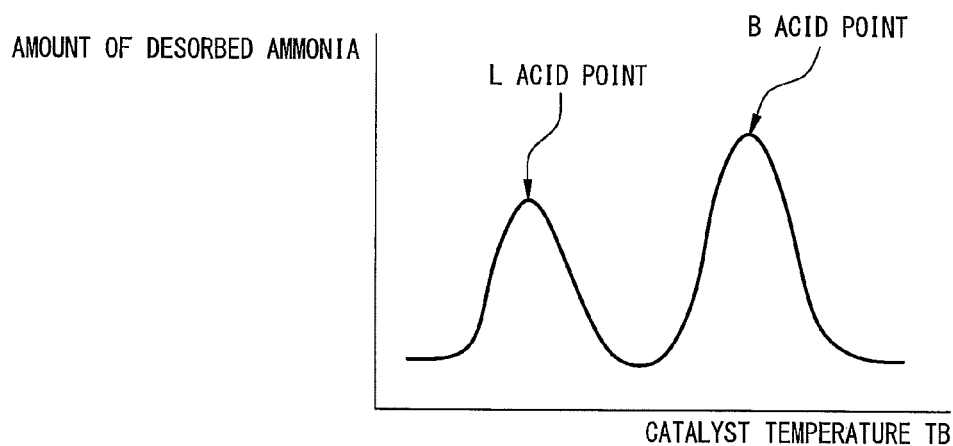
FIG. 8 is a view which shows a change in the amount of desorbed ammonia due to the difference in the method of adsorption of ammonia.
Figure 9A:
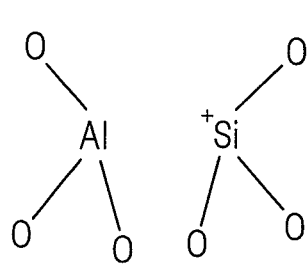
FIGS. 9A and 9B are views for explaining the method of adsorption of ammonia.
Figure 9B:
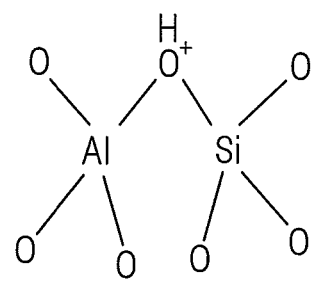

FIG. 8 shows the change of the amount of desorbed ammonia when making the temperature TB of the $NO_x$ selective reduction catalyst 23 gradually rise. From FIG. 8, it will be understood that if raising the temperature TB of the $NO_x$ selective reduction catalyst 23, two peaks appear. One peak (L acid point) in FIG. 8 is due to the desorption of ammonia which is adsorbed at the weak acid point called the Lewis acid point (L acid point) such as shown in FIG. 9A, while the other peak (B acid point) in FIG. 8 is due to the desorption of ammonia which is adsorbed at the strong acid point called the Bronsted acid point (B acid point) such as shown in FIG. 9B. The ammonia which is adsorbed at the Lewis acid point (L acid point), that is, weak acid point, such as shown in FIG. 9A is easily desorbed when $NO_x$ arrives even when the temperature TB of the $NO_x$ selective reduction catalyst 23 is relatively low such as shown in FIG. 8. The $NO_x$ is easily reduced by this desorbed ammonia.

As opposed to this, the ammonia which is adsorbed at the Bronsted acid point (B acid point), that is, the strong acid point, which is shown in FIG. 9B is not desorbed even when $NO_x$ arrives when the temperature TB of the $NO_x$ selective reduction catalyst 23 is relatively low and is first desorbed when the temperature TB of the $NO_x$ selective reduction catalyst 23 becomes higher. At the time of ordinary operation, the temperature TB of the $NO_x$ selective reduction catalyst 23 does not rise to the temperature which is shown by the B acid point of FIG. 8. Therefore, the ammonia which is adsorbed at the Bronsted acid point (B acid point), that is, the strong acid point, which is shown in FIG. 9B cannot be used for reducing the $NO_x$. Therefore, to reduce the $NO_x$ by the adsorbed ammonia, the ammonia has to be adsorbed at the Lewis acid point (L acid point), that is, weak acid point, such as in FIG. 9A.

Figure 10:
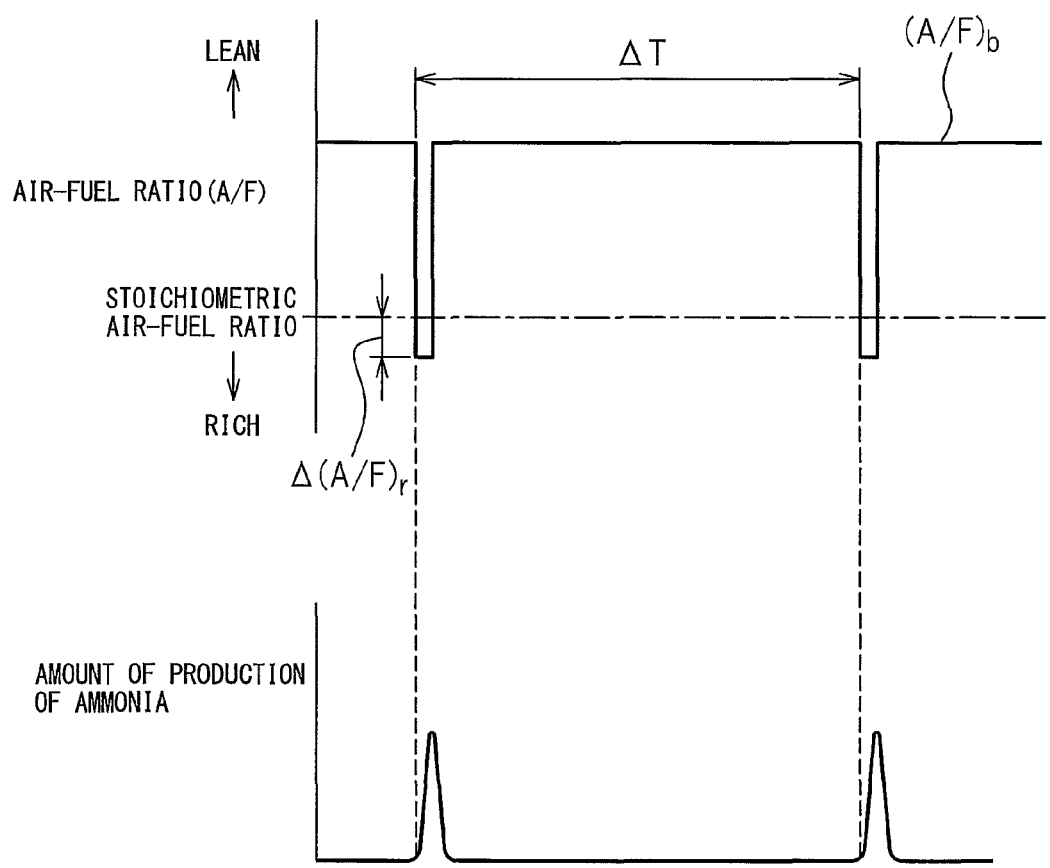
FIG. 10 is a view which shows the relationship between the change of the air-fuel ratio and the amount of production of ammonia.

FIG. 10 shows the change in the air-fuel ratio (A/F) in the combustion chamber 5 and the amount of production of ammonia at the $NO_x$ storage catalyst 22 when utilizing the action of the $NO_x$ storage catalyst 22 to store and release $NO_x$ at the time of engine low load operation so as to remove $NO_x$. Note that, in FIG. 10, (A/F)b indicates the base air-fuel ratio, Δ(A/F)r indicates the rich degree of the air-fuel ratio, and ΔT indicates the rich period of the air-fuel ratio. The ammonia which is produced at this time is adsorbed at the Lewis acid point (L acid point), that is, weak acid point, such as shown in FIG. 9A. Therefore, the $NO_x$ which flows out from the $NO_x$ storage catalyst 22 is reduced well by the ammonia which is adsorbed at the $NO_x$ selective reduction catalyst 23.

If the engine load becomes higher, the amount of $NO_x$ which is produced in the combustion chamber 5 increases and therefore the $NO_x$ which is stored at the $NO_x$ storage catalyst 22 per unit time increases. If the $NO_x$ which is stored in the $NO_x$ storage catalyst 22 per unit time increases, the amount of additional fuel which is supplied per unit time for making the air-fuel ratio rich for release of $NO_x$ increases. If the amount of additional fuel which is supplied per unit time increases, the amount of ammonia which is produced per unit time in the $NO_x$ storage catalyst 22 increases. That is, if the engine load becomes higher, the amount of ammonia which is produced per unit time in the $NO_x$ storage catalyst 22 increases.

In this regard, when the ammonia reaches the $NO_x$ selective reduction catalyst 23, the ammonia is adsorbed from the easy adsorbing Lewis acid point (L acid point), that is, weak acid point. If the amount of adsorption at the weak acid point becomes saturated, adsorption at the hard adsorbing Bronsted acid point (B acid point), that is, strong acid point, is started. In this case, as explained above, the ammonia adsorbed at the strong acid point cannot be effectively used for reduction of the $NO_x$. Therefore, to effectively use the adsorbed ammonia for reducing the $NO_x$, it is necessary that the amount of production of ammonia be suppressed so that all of the ammonia is adsorbed at the weak acid point without being adsorbed at the strong acid point.

Figure 11:
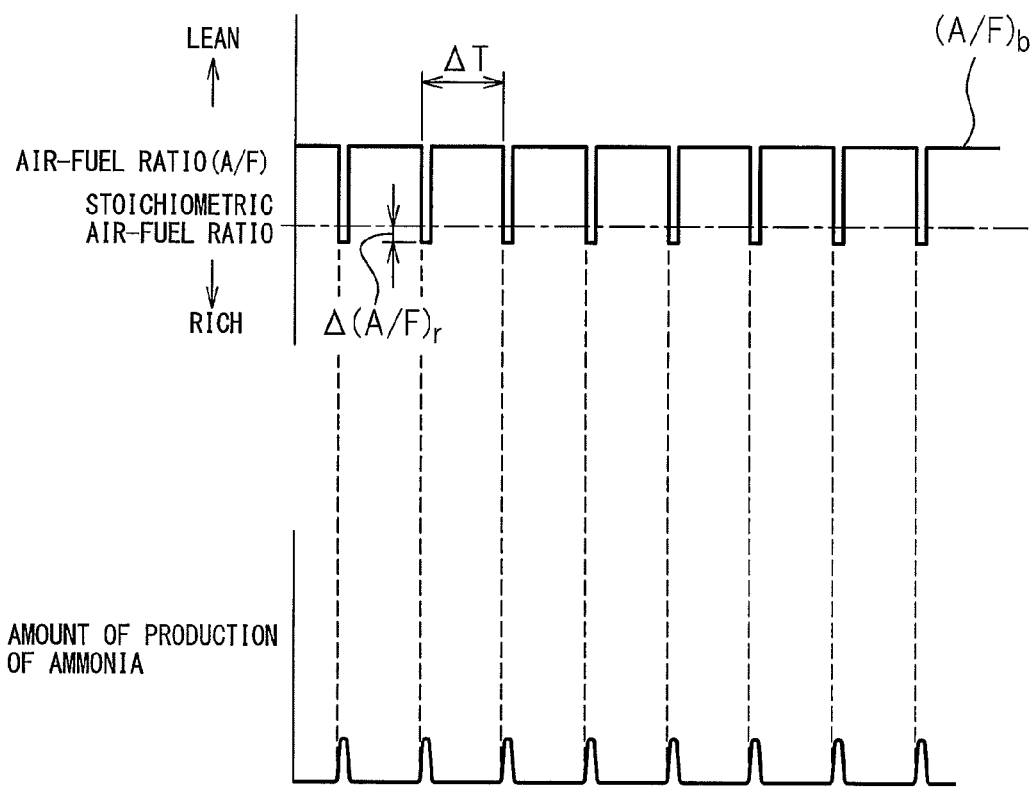
FIG. 11 is a view which shows the relationship between the change of the air-fuel ratio and the amount of production of ammonia.

Therefore, in the present invention, as stated above, when the engine load becomes higher and the amount of ammonia which is produced per unit time in the $NO_x$ storage catalyst 22 increases, the degree of richness of the air-fuel ratio in the combustion chamber is controlled so that the amount of ammonia which is produced per unit time falls. The change of the air-fuel ratio (A/F) in the combustion chamber 5 and the amount of production of ammonia at the $NO_x$ storage catalyst 22 at this time are shown in FIG. 11. Note that, in FIG. 11, (A/F)b shows the base air-fuel ratio, Δ(A/F)r shows the rich degree of the air-fuel ratio, and ΔT shows the rich period of the air-fuel ratio.

As shown in FIG. 11, when the engine load becomes high, compared with the time of engine low load operation which is shown in FIG. 10, the base air-fuel ratio (A/F)b is lowered, the rich degree Δ(A/F)r of the air-fuel ratio is made smaller, and the rich period ΔT of the air-fuel ratio is made shorter. That is, if the amount of additional fuel injection when making the air-fuel ratio rich becomes greater, the amount of hydrocarbons and other reducing agents also becomes greater, so the amount of production of ammonia tends to increase. Therefore, to reduce the amount of injection of additional fuel when making the air-fuel ratio rich, as shown in FIG. 11, the base air-fuel ratio (A/F)b is lowered, the rich degree Δ(A/F)r of the air-fuel ratio is made smaller, and the rich period ΔT of the air-fuel ratio is made shorter.

That is, in the present invention, in an exhaust purification system of a spark ignition type internal combustion engine in which the $NO_x$ storage catalyst 22 storing $NO_x$ in exhaust gas when the air-fuel ratio of the inflowing exhaust gas is lean and releasing the stored $NO_x$ when the air-fuel ratio of the inflowing exhaust gas is made rich is arranged in the engine exhaust passage, the $NO_x$ selective reduction catalyst 23 is arranged in the engine exhaust passage downstream of the $NO_x$ storage catalyst 22, an ammonia which is produced at the $NO_x$ storage catalyst 22 when the air-fuel ratio of the inflowing exhaust gas is made rich is adsorbed at the $NO_x$ selective reduction catalyst 23, and $NO_x$ in the exhaust gas is reduced by the ammonia which is adsorbed at the $NO_x$ selective reduction catalyst 23, at the time of engine low load operation, a combustion is performed in the combustion chamber 5 under a lean base air-fuel ratio and the air-fuel ratio in the combustion chamber 5 is made rich when $NO_x$ should be released from the $NO_x$ storage catalyst 22, and when an engine load becomes higher compared with the time of engine low load operation, the base air-fuel ratio is made smaller, a degree of richness of the air-fuel ratio is made smaller, and a period in which the air-fuel ratio is made rich is made shorter so that an amount of ammonia which is produced per unit time when the air-fuel ratio is made rich falls compared with the time of engine low load operation.

Figure 12:
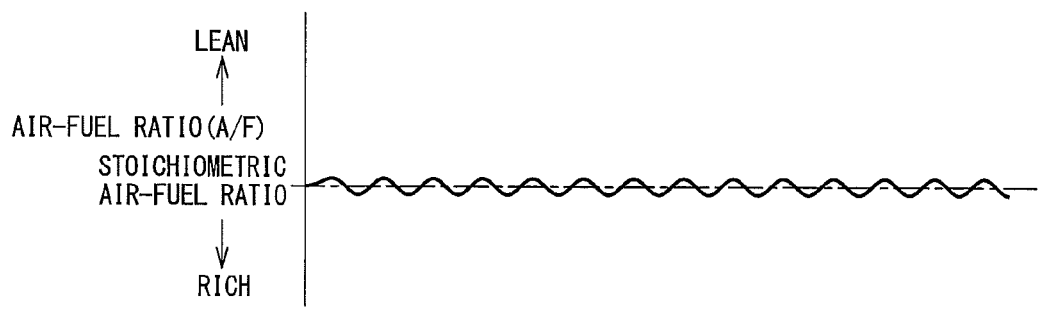
FIG. 12 is a view which shows the time when the air-fuel ratio in a combustion chamber is feedback controlled to the stoichiometric air-fuel ratio.

Note that, FIG. 12 shows the change in the air-fuel ratio in the combustion chamber 5 in the case where the air-fuel ratio in the combustion chamber 5 is feedback controlled to the stoichiometric air-fuel ratio.

Now, when the engine load becomes higher, if, compared with the time of engine low load operation, the base air-fuel ratio is made smaller, the degree of richness of the air-fuel ratio is made smaller, and the period of making the air-fuel ratio rich is made shorter, as stated above, the action of removal of $NO_x$ by the ammonia adsorbed at the $NO_x$ selective reduction catalyst 23 is improved. In this case, it was discovered by the inventors that, at the same time, the $NO_x$ purification rate at the $NO_x$ storage catalyst 22 is improved. This new $NO_x$ removal method which was discovered by the inventors is based on the action of adsorption of NO in the $NO_x$ storage catalyst 22.

Namely, in the past, it has been known that an $NO_x$ storage catalyst 22 adsorbs NO. However, the behavior of the adsorbed NO has not been pursued that much at all up to now. Therefore, the inventors pursued the behavior of the adsorbed NO and found out that if utilizing the adsorption characteristics of this adsorbed NO, it is possible to secure a high $NO_x$ purification rate even if burning fuel under a lean air-fuel ratio when the temperature TC of the $NO_x$ storage catalyst 22 is high. This new $NO_x$ removal method utilizes the NO adsorption action, so below this new $NO_x$ removal method will be referred to as an "$NO_x$ removal method utilizing adsorbed NO". Therefore, next, this $NO_x$ removal method utilizing adsorbed NO will be explained while referring to FIGS. 13A and 13B.

Figure 13A:
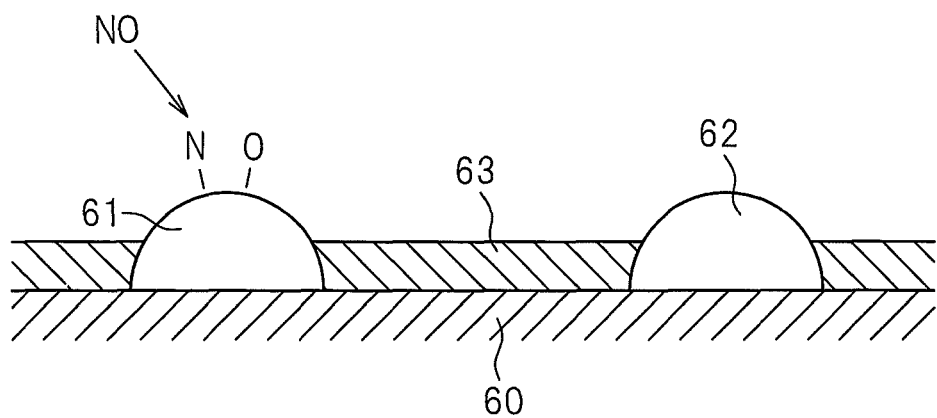
FIGS. 13A and 13B are views for explaining an oxidation reduction reaction in an $NO_x$ storage catalyst.
Figure 13B:
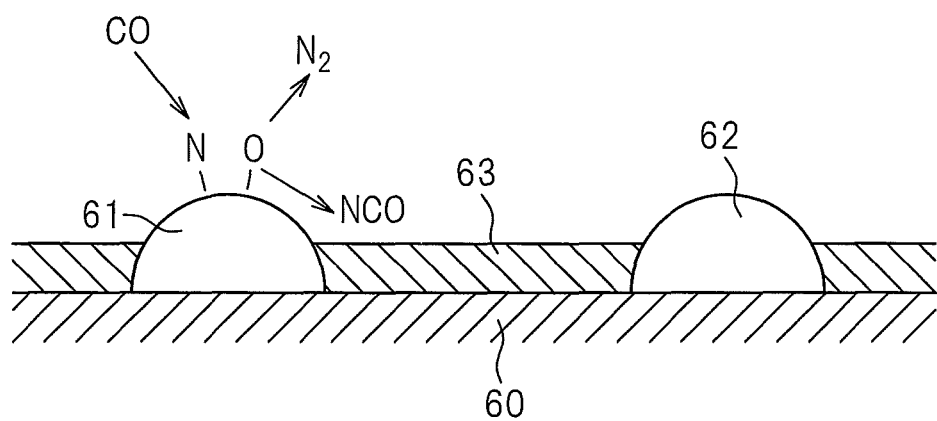

FIGS. 13A and 13B are enlarged views of FIG. 3B, that is, show surface parts of the catalyst carrier 60 of the $NO_x$ storage catalyst 22. Further, FIG. 13A shows the time when fuel is burned under a lean air-fuel ratio, while FIG. 13B shows the time when the air-fuel ratio in the combustion chamber 5 is made rich. When fuel is burned under a lean air-fuel ratio, that is, when the air-fuel ratio of the exhaust gas is lean, as explained above, the $NO_x$ which is contained in the exhaust gas is absorbed at the basicity layer 63, but part of the NO which is contained in the exhaust gas, as shown in FIG. 13A, disassociates and is adsorbed at the surface 61 of the platinum Pt. This amount of adsorption of NO on the surface 61 of the platinum Pt increases together with the elapse of time. Therefore, along with the elapse of time, the amount of adsorption of NO at the $NO_x$ storage catalyst 22 increases.

On the other hand, if the air-fuel ratio in the combustion chamber 5 is made rich, a large amount of carbon monoxide CO is exhausted from the combustion chamber 5. Therefore, the exhaust gas which flows into the $NO_x$ storage catalyst 22 contains a large amount of carbon monoxide CO. This carbon monoxide CO, as shown in FIG. 13B, reacts with the NO which disassociates and is adsorbed at the surface 61 of the platinum Pt. This NO on the one hand becomes $N_2$ and on the other hand becomes the reducing intermediate NCO. This reducing intermediate NCO continues to be held or adsorbed on the surface of the basicity layer 63 for a while after being produced. Therefore, the amount of the reducing intermediate NCO on the basicity layer 63 gradually increases along with the elapse of time. This reducing intermediate NCO reacts with the $NO_x$ which is contained in the exhaust gas whereby the $NO_x$ which is contained in the exhaust gas is removed.

In this way, when fuel is burned under a lean air-fuel ratio, that is, when the air-fuel ratio of the exhaust gas is lean, on the one hand, as shown in FIG. 4A, the $NO_x$ which is contained in the exhaust gas is absorbed at the $NO_x$ storage catalyst 22 and on the other hand, as shown in FIG. 13A, the NO which is contained in the exhaust gas is adsorbed at the $NO_x$ storage catalyst 22. That is, at this time, the $NO_x$ which is contained in the exhaust gas is stored in the $NO_x$ storage catalyst 22. As opposed to this, if the air-fuel ratio in the combustion chamber 5 is made rich, the $NO_x$ which had been absorbed or adsorbed at the $NO_x$ storage catalyst 22, that is, the $NO_x$ which had been stored at the $NO_x$ storage catalyst 22, is released from the $NO_x$ storage catalyst 22.

Figure 14A:
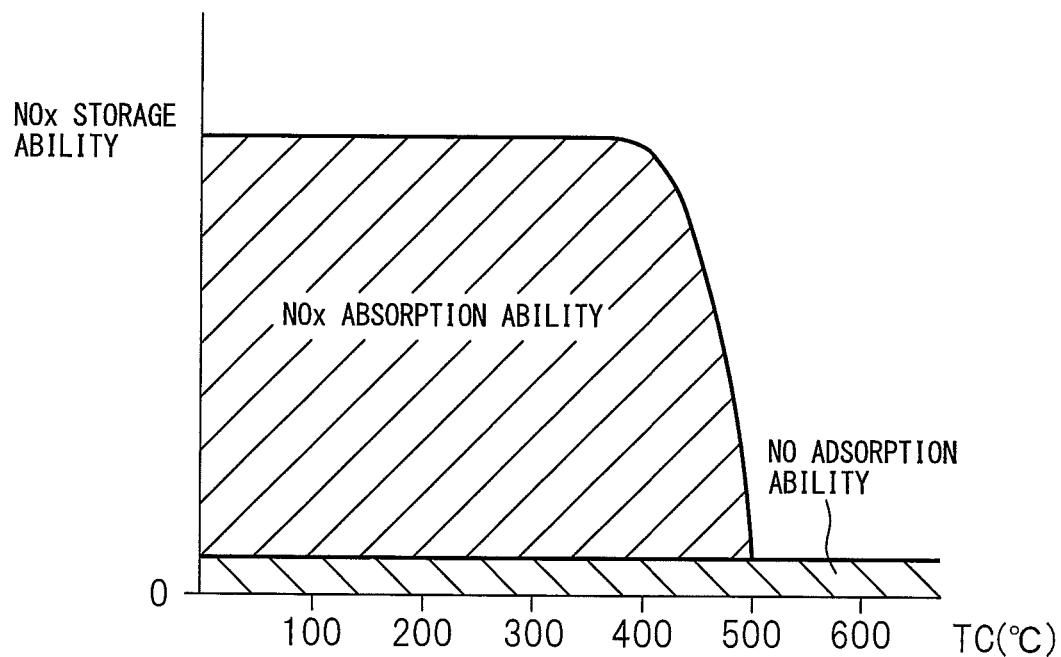
FIGS. 14A and 14B are views for explaining an $NO_x$ absorption ability and NO adsorption ability.

FIG. 14A shows the $NO_x$ absorption ability and the NO adsorption ability in case where $NO_x$ is removed by using the $NO_x$ storage and release action of the $NO_x$ storage catalyst 22 as shown in FIG. 5. Note that, in FIG. 14A, the ordinate shows the sum of the $NO_x$ absorption ability and NO adsorption ability, that is, the $NO_x$ storage ability, while the abscissa shows the temperature TC of the $NO_x$ storage catalyst 22. As will be understood from FIG. 14A, when the temperature TC of the $NO_x$ storage catalyst 22 is lower than about 400° C., regardless of the temperature TC of the $NO_x$ storage catalyst 22, the $NO_x$ absorption ability and NO adsorption ability are constant. Therefore, the sum of the $NO_x$ absorption ability and the NO adsorption ability, that is, the $NO_x$ storage ability, also becomes constant regardless of the temperature TC of the $NO_x$ storage catalyst 22.

On the other hand, if the temperature TC of the $NO_x$ storage catalyst 22 becomes higher, the $NO_x$ oxidation reaction (NO→$NO_2$) on the surface 61 of the platinum Pt becomes faster. However, if the temperature TC of the $NO_x$ storage catalyst 22 becomes higher, the reaction by which $NO_2$ becomes nitric acid ions $NO_3^-$ ($NO_2$+$Ba(CO_3)_2$→$Ba(NO_3)_2$+$CO_2$) becomes slower and, as a result, $NO_x$ becomes harder to store at the $NO_x$ storage catalyst 22. Further, if the temperature TC of the $NO_x$ storage catalyst 22 becomes higher, the nitrates break down due to heat and are discharged in the form of $NO_2$ from the $NO_x$ storage catalyst 22. Therefore, as shown in FIG. 14A, if the temperature TC of the $NO_x$ storage catalyst 22 becomes higher and reaches a 400° C. or more high temperature, the $NO_x$ absorption ability rapidly falls. As opposed to this, the amount of adsorption of NO at the surface 61 of the platinum Pt is not affected much at all by the temperature TC of the $NO_x$ storage catalyst 22. Therefore, as shown in FIG. 14A, the NO adsorption ability does not change much at all even if the temperature TC of the $NO_x$ storage catalyst 22 rises.

Next, while referring to FIGS. 15A and 15B, the relationship between the oxygen concentration of the exhaust gas, the NO adsorption ability, and the $NO_x$ absorption ability when fuel is burned under a lean air-fuel ratio will be explained. First, if considering the adsorption at the surface 61 of the platinum Pt, NO and $O_2$ are adsorbed on the surface 61 of the platinum Pt in a competing manner. That is, the larger the amount of NO which is contained in the exhaust gas compared with the amount of $O_2$, the greater the amount of NO which is adsorbed at the surface 61 of the platinum Pt compared with the amount of $O_2$. Conversely, the greater the amount of $O_2$ which is contained in the exhaust gas compared with the amount of NO, the smaller the amount of NO which is adsorbed at the surface 61 of the platinum Pt compared with the amount of $O_2$. Therefore, the NO adsorption ability at the $NO_x$ storage catalyst 22, as shown in FIG. 15A, falls the higher the oxygen concentration of the exhaust gas.

On the other hand, the higher the oxygen concentration of the exhaust gas, the more the oxidation action of the NO in the exhaust gas is promoted and the more the absorption of $NO_x$ in the $NO_x$ storage catalyst 22 is promoted. Therefore, as shown in FIG. 15B, the higher the $NO_x$ absorption ability in the $NO_x$ storage catalyst 22, the higher the oxygen concentration of the exhaust gas. Note that, in FIGS. 15A and 15B, the region X shows the time when fuel is burned under a lean air-fuel ratio in case where $NO_x$ is removed by utilizing the $NO_x$ storage and release action of the $NO_x$ storage catalyst 22 as shown in FIG. 5. At this time, it is learned that the NO adsorption ability is low and the $NO_x$ absorption ability is high. The above-mentioned FIG. 14A shows the NO adsorption ability and the $NO_x$ absorption ability at this time.

Now then, as already explained with reference to FIG. 14A, if the temperature TC of the $NO_x$ storage catalyst 22 becomes higher and reaches a 400° C. or more high temperature, the $NO_x$ absorption ability rapidly falls. As opposed to this, the NO adsorption ability does not change much at all even if the temperature TC of the $NO_x$ storage catalyst 22 becomes high. Therefore, when the temperature TC of the $NO_x$ storage catalyst 22 becomes high and reaches a 4000C or more high temperature, if ceasing use of the $NO_x$ removal method utilizing the $NO_x$ absorption action and instead using the $NO_x$ removal method utilizing the NO adsorption action, it is guessed that $NO_x$ may be able to be removed. However, as will be understood from FIG. 14A, the NO adsorption ability is low. To utilize the NO adsorption action to remove the $NO_x$ without inviting an increase in the fuel consumption, the NO adsorption ability has to be increased.

Figure 14B:
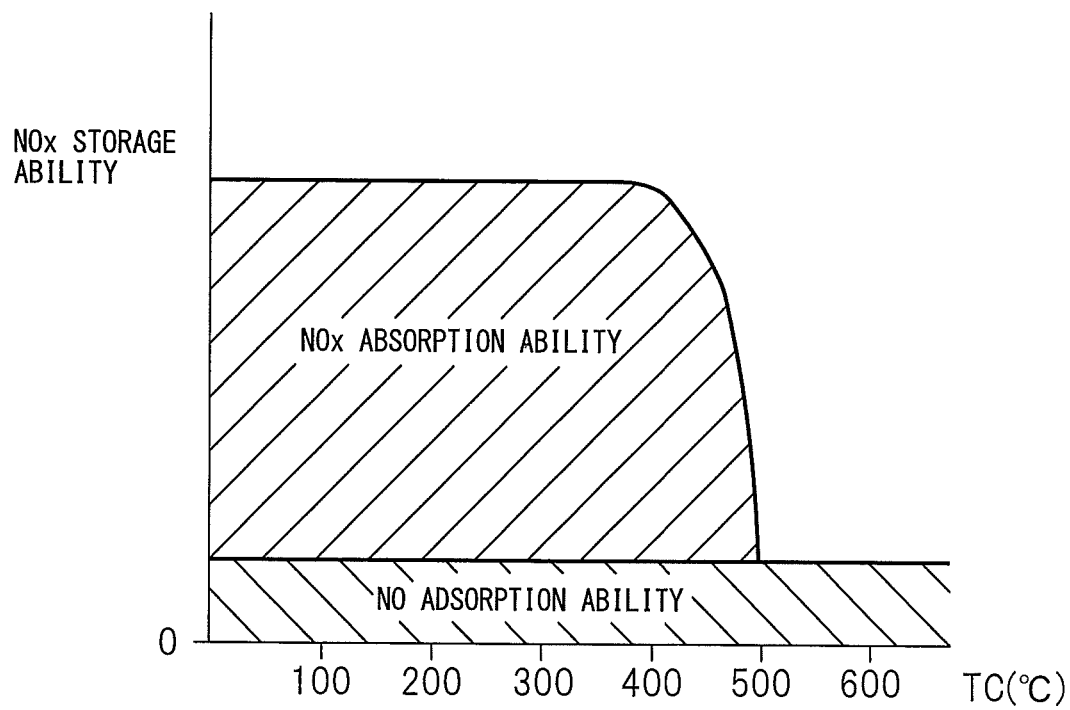
Figure 15A:
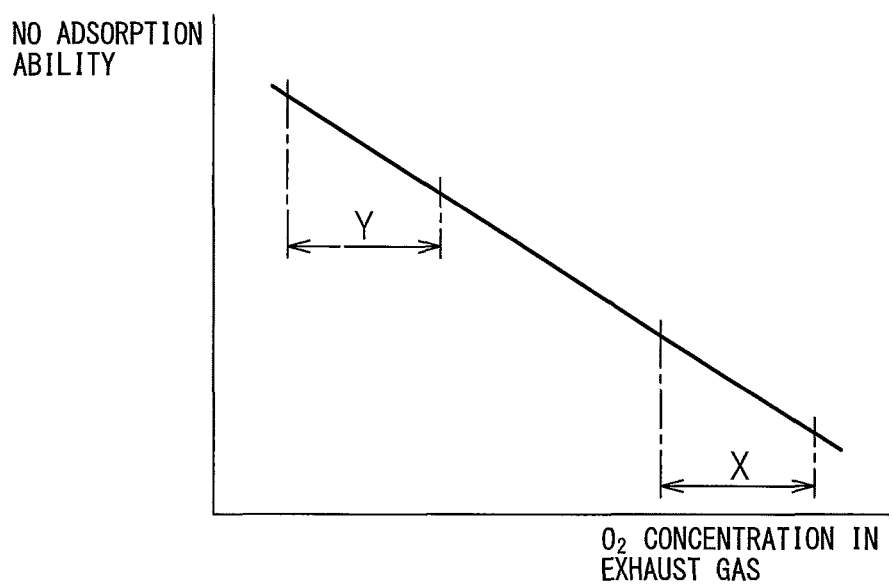
FIGS. 15A and 15B are views for explaining an $NO_x$ absorption ability and NO adsorption ability.
Figure 15B:
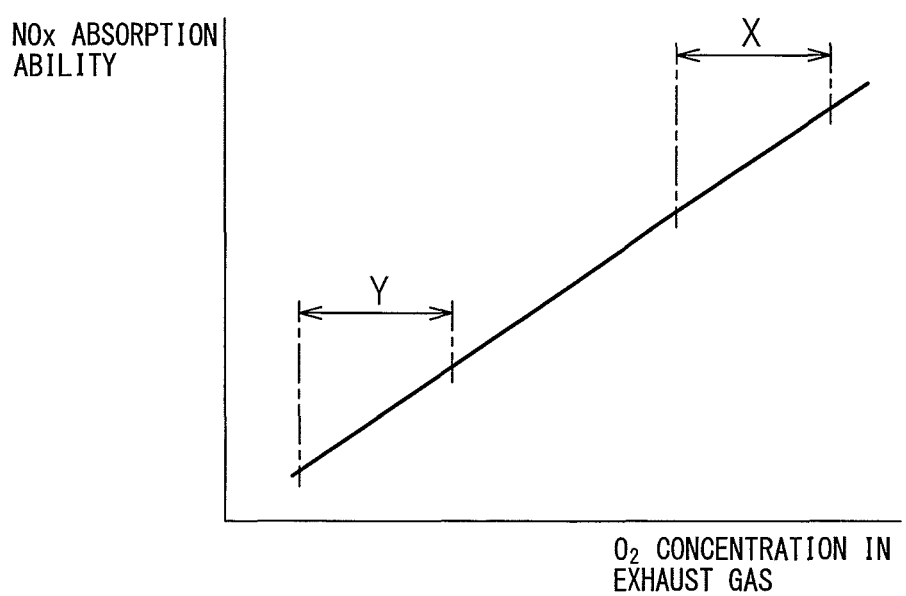

In this case, to make the NO adsorption ability increase, as will be understood from FIG. 15A, it is sufficient to cause the oxygen concentration of the exhaust gas to fall. At this time, as shown in FIG. 15B, the $NO_x$ absorption ability falls. The $NO_x$ absorption ability and NO adsorption ability when making the oxygen concentration of the exhaust gas fall to the region Y in FIGS. 15A and 15B are shown in FIG. 14B. By making the oxygen concentration of the exhaust gas fall, the NO adsorption ability can be made to increase. "Making the oxygen concentration of the exhaust gas fall" means making the air-fuel ratio when fuel is burned under a lean air-fuel ratio (called the "base air-fuel ratio") fall. Therefore, by making the base air-fuel ratio fall, the NO adsorption ability can be made to increase.

That is, as shown in FIG. 11, if the base air-fuel ratio is made to fall, a good action of removal of $NO_x$ utilizing the action of adsorption of NO is performed. Note that at this time, as shown in FIG. 11, it is learned that compared with the time of engine low load operation, if not only is the base air-fuel ratio made smaller, but also the degree of richness of the air-fuel ratio is made smaller and the period of making the air-fuel ratio rich is made shorter, a good action of removal of $NO_x$ utilizing the action of adsorption of NO is performed.

Figure 16:
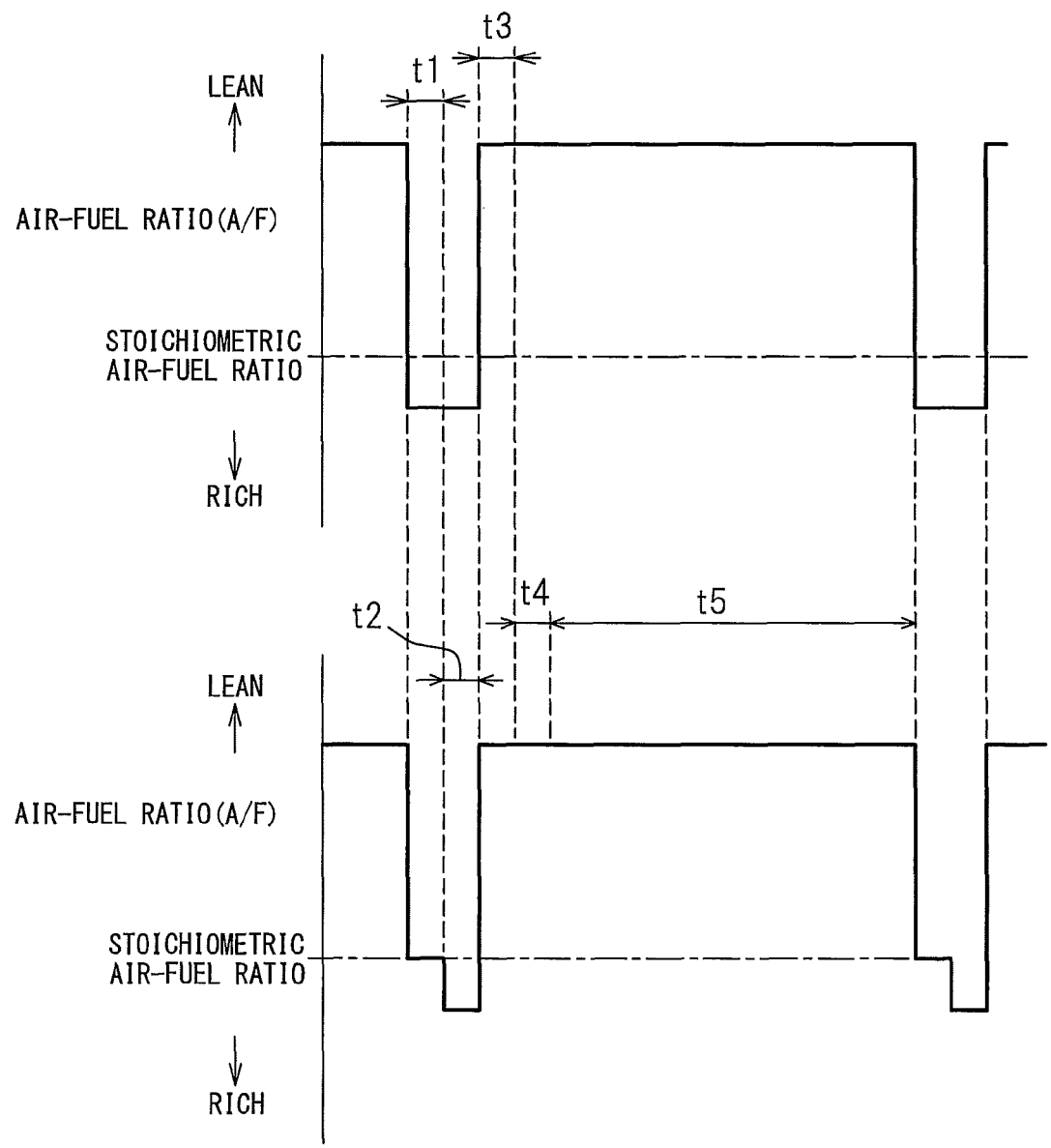
FIG. 16 is a time chart which shows the change in the air-fuel ratio of exhaust gas which flows into the three-way catalyst and $NO_x$ storage catalyst.

FIG. 16 shows the change in the air-fuel ratio (A/F) in the combustion chamber 5 and the change in the air-fuel ratio of the exhaust gas (A/F) in which flows into the $NO_x$ storage catalyst 22 in the case of utilizing the NO adsorption action to remove $NO_x$ as shown in FIG. 11. In this case, if the air-fuel ratio (A/F) in the combustion chamber 5 is made rich, in the three-way catalyst 20, the stored oxygen is released and the air-fuel ratio is maintained at the stoichiometric air-fuel ratio for the time t1. Due to this, HC, CO, and $NO_x$ are simultaneously reduced. During this time, as shown in FIG. 16, the air-fuel ratio of the exhaust gas (A/F) in which flows into the $NO_x$ storage catalyst 22 is maintained at the stoichiometric air-fuel ratio. Next, if the stored oxygen of the three-way catalyst 20 is consumed, the air-fuel ratio of the inflowing exhaust gas (A/F) in which flows into $NO_x$ storage catalyst 22 becomes rich for the time t2. At this time, as shown in FIG. 13B, the NO which disassociates and is adsorbed on the surface 61 of the platinum Pt on the one hand becomes $N_2$ and on the other hand becomes the reducing intermediate NCO. This reducing intermediate NCO continues to be held or adsorbed on the surface of the basicity layer 63 for a while after being formed.

Next, if the air-fuel ratio (A/F) in the combustion chamber 5 is again returned to the lean state, this time oxygen is stored in the three-way catalyst 20. At this time, at the catalyst surface of the three-way catalyst 20, the air-fuel ratio is maintained at the stoichiometric air-fuel ratio for the time t3. Due to this, at this time as well, HC, CO, and $NO_x$ are simultaneously decreased. Next, during the time t4, the $NO_x$ which is contained in the exhaust gas reacts with the reducing intermediate NCO which is held or adsorbed on the surface of the basicity layer 63 and is reduced by the reducing intermediate NCO. Next, for the time t5, the NO which is contained in the exhaust gas is disassociated and adsorbed at the surface 61 of the platinum Pt as shown in FIG. 13A.

Figure 17:
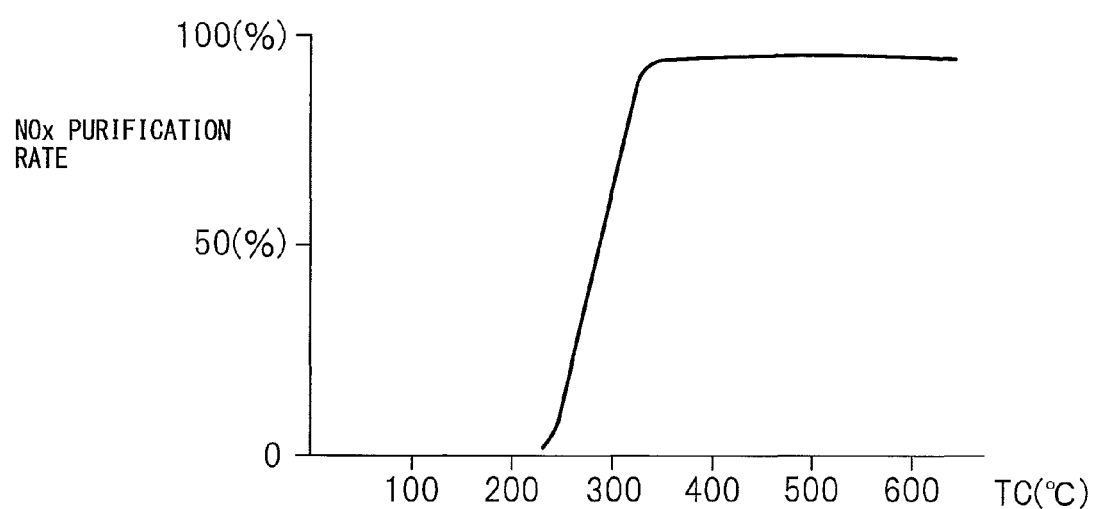
FIG. 17 is a view which shows an $NO_x$ purification rate.

In this way, as shown in FIG. 11, when the engine load becomes higher, if, compared with the time of engine low load operation, the base air-fuel ratio is made smaller, the degree of richness of the air-fuel ratio is made smaller, and the period of making the air-fuel ratio rich is made shorter, three actions of removal, comprised of the action of removal of $NO_x$ utilizing the action of adsorption of $NO_x$ the action of removal of $NO_x$ utilizing the function of storing oxygen at the three-way catalyst 20, and the action of removal of $NO_x$ by ammonia which is adsorbed at the $NO_x$ selective reduction catalyst 23 are performed. The $NO_x$ purification rate at this time is shown in FIG. 17. As shown in FIG. 17, in this case, it is learned that even if the temperature TC of the $NO_x$ storage catalyst 22 becomes higher and reaches a temperature of 400° C. or more, the $NO_x$ purification rate does not fall.

Figure 18:
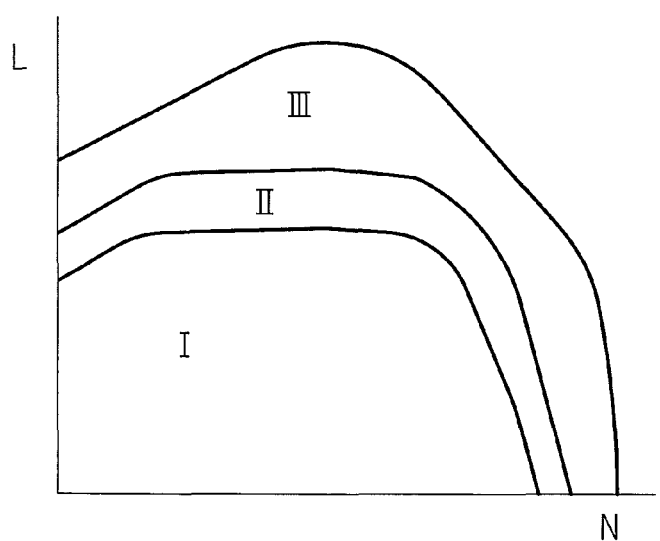
FIG. 18 is a view which shows an engine operating region.

Next, the control of engine operation will be explained in brief. In one embodiment according to the present invention, as shown in FIG. 18, the engine low load operating region I of the engine low load operation side, the engine high load operating region III of the engine high load operation side, and the engine medium load operating region II positioned between the engine low load operating region I and the engine high load operating region III are set in advance. Note that, in FIG. 18, the ordinate L shows the required load, while the abscissa N shows the engine speed. In this case, in the engine low load operating region I, as shown in FIG. 10, the action of removal of $NO_x$ which utilizes the action of storage and release of $NO_x$ to and from the $NO_x$ storage catalyst 22 so as to remove the $NO_x$ is performed, while in the engine medium load operating region II, as shown in FIG. 11, the action of removal of $NO_x$ which utilizes the action of adsorption of NO so as to remove the $NO_x$ is performed. Note that, in the engine high load operating region III, as shown in FIG. 12, the air-fuel ratio in the combustion chamber 5 is feedback controlled to the stoichiometric air-fuel ratio.

That is, in this embodiment, the a three-way catalyst 20 is arranged in the engine exhaust passage upstream of the $NO_x$ storage catalyst 22, the operating region of the engine is comprised of a predetermined engine low load operating region I at the engine low load operation side, a predetermined engine high load operating region III at the engine high load operation side, and a predetermined engine medium load operating region II which is positioned between the engine low load operating region I and engine high load operating region III, in the predetermined engine low load operating region I, a combustion is performed in the combustion chamber 5 under a lean base air-fuel ratio and the air-fuel ratio in the combustion chamber 5 is made rich when $NO_x$ should be released from the $NO_x$ storage catalyst 22, in the predetermined engine high load operating region III, the air-fuel ratio in the combustion chamber 5 is feedback controlled to the stoichiometric air-fuel ratio, and, in the predetermined engine medium load operating region II, the base air-fuel ratio is made smaller, a degree of richness of the air-fuel ratio is made smaller, and a period in which the air-fuel ratio is made rich is made shorter so that an amount of ammonia which is produced per unit time when the air-fuel ratio is made rich falls compared with the time of engine low load operation.

Note that as will be understood from FIGS. 10, 11, and 12, the base air-fuel ratio in the engine medium load operating region II is a value between the base air-fuel ratio in the engine low load operating region I and the stoichiometric air-fuel ratio.

Figure 19:
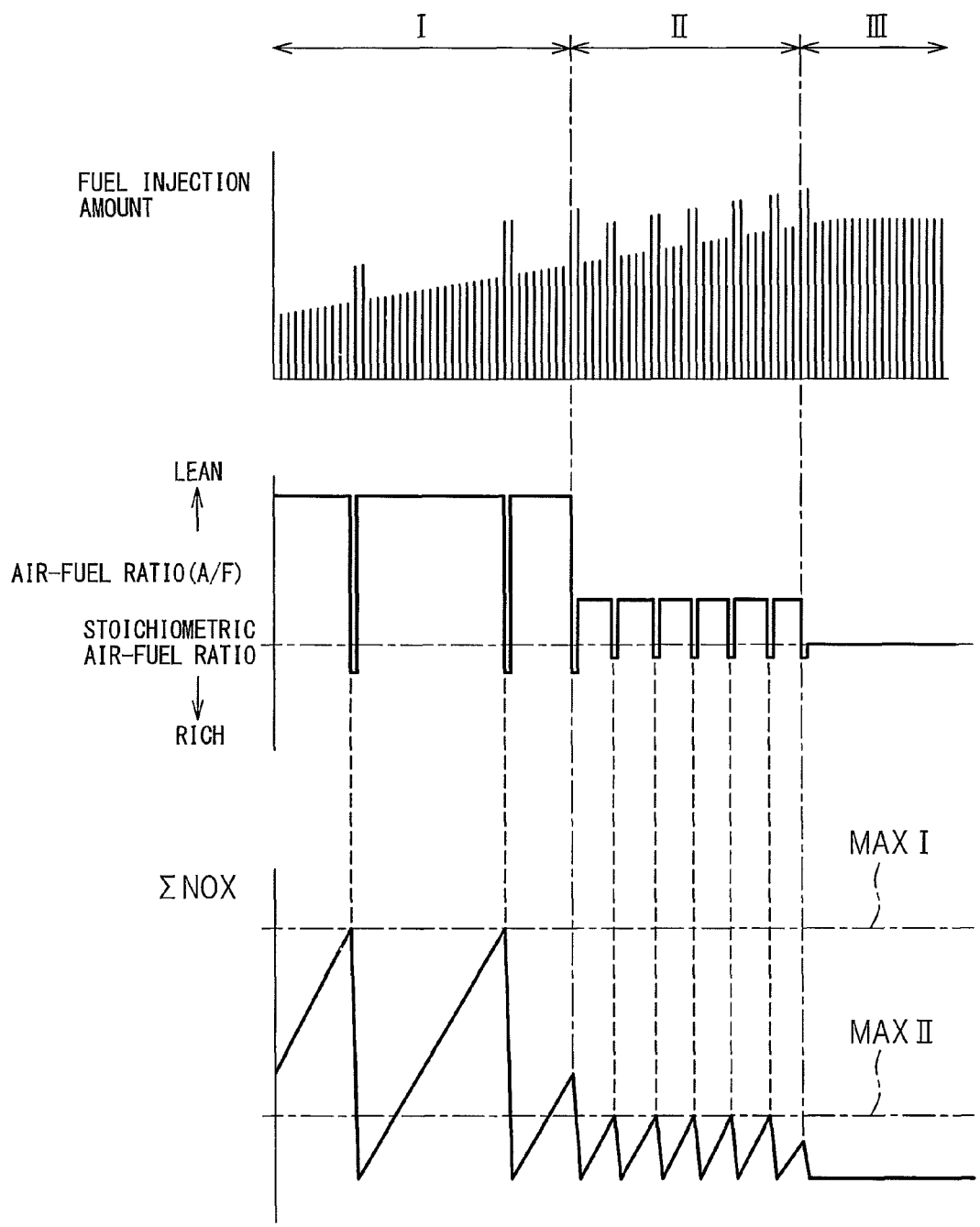
FIG. 19 is a time chart which shows changes in a fuel injection amount etc. at the time of engine operation.

Next, the $NO_x$ removal method will be explained while referring to FIG. 19 which shows the time of shifting from low load operation to high load operation. Note that, FIG. 19 shows the change in the amount of fuel injection in the combustion chamber 5, the change in the air-fuel ratio (A/F) in the combustion chamber 5, and the change of the stored $NO_x$ amount ΣNOX. Further, in FIG. 19, MAXI shows the first allowable $NO_x$ storage amount, while MAXII shows the second allowable $NO_x$ storage amount. As clear from FIG. 19, the second allowable $NO_x$ storage amount MAXII is made a smaller value compared with the first allowable $NO_x$ storage amount MAXI.

Now then, in FIG. 19, in the engine low load operating region I, if the stored $NO_x$ amount ΣNOX exceeds the first allowable $NO_x$ storage amount MAXI, the air-fuel ratio in the combustion chamber 5 is temporarily made rich. On the other hand, in the state where the $NO_x$ is stored in the $NO_x$ storage catalyst 22, if switching to the method of removal of $NO_x$ utilizing the action of adsorption of NO which is shown in FIG. 11, right after switching to removal of $NO_x$ utilizing the action of adsorption of NO, part of the $NO_x$ which is stored in $NO_x$ storage catalyst 22 is released without being reduced. Therefore, in the embodiment according to the present invention, as shown in FIG. 19, when the operating state of the engine shifts from the engine low load operating region I to the engine medium load operating region II, the air-fuel ratio (A/F) in the combustion chamber 5 is made temporarily rich.

In the engine medium load operating region II, as shown in FIG. 19, if the stored $NO_x$ amount ΣNOX exceeds the second allowable $NO_x$ storage amount MAXII, the air-fuel ratio in the combustion chamber 5 is temporarily made rich. In this engine medium load operating region II, the $NO_x$ storage catalyst 22 is high in temperature, so the $NO_x$ storage catalyst 22 does not absorb much $NO_x$ as well and a majority of the $NO_x$ is comprised of the adsorbed NO. Therefore, explained in another manner, the amount of adsorption of NO which is adsorbed at the $NO_x$ storage catalyst 22 is calculated and when the engine is operating in the engine medium load operating region II, the air-fuel ratio (A/F) in the combustion chamber 5 is made rich when NO adsorption amount ΣNOX exceeds the predetermined allowable NO adsorption amount MAXII.

In this way, in this embodiment, the $NO_x$ storage amount ΣNOX which is stored in the $NO_x$ storage catalyst 22 is calculated and if the $NO_x$ storage amount ΣNOX exceeds the predetermined first allowable $NO_x$ storage amount MAXI when the engine is operating in the engine low load operating region I, the air-fuel ratio (A/F) in the combustion chamber 5 is made rich, while if the $NO_x$ storage amount ΣNOX exceeds the predetermined second allowable $NO_x$ storage amount MAXII when the engine is operating in the engine medium load operating region II, the air-fuel ratio (A/F) in the combustion chamber 5 is made rich. The second allowable $NO_x$ storage amount MAXII is made a value smaller than the first allowable $NO_x$ storage amount MAXI.

On the other hand, in the state where the $NO_x$ storage catalyst 22 stores $NO_x$, if the method of removal of $NO_x$ is switched to one by feedback control to the stoichiometric air-fuel ratio which is shown in FIG. 12, right after switching to the method of removal of $NO_x$ by feedback control to the stoichiometric air-fuel ratio, part of the $NO_x$ which is stored in the $NO_x$ storage catalyst 22 is released without being reduced. Therefore, in this embodiment, as shown in FIG. 19, when the operating state of the engine shifts from the engine medium load operating region II to the engine high load operating region III, the air-fuel ratio (A/F) in the combustion chamber 5 is temporarily made rich.

In the engine high load operating region III, the feedback control of the amounts of injection from the fuel injectors 11 and 12 is performed based on the output signal of the air-fuel ratio sensor 27 so that the air-fuel ratio in the combustion chamber 5 becomes the stoichiometric air-fuel ratio. At this time, the harmful ingredients HC, CO, and $NO_x$ which are contained in the exhaust gas are simultaneously removed in the three-way catalyst 20.

Figure 20:
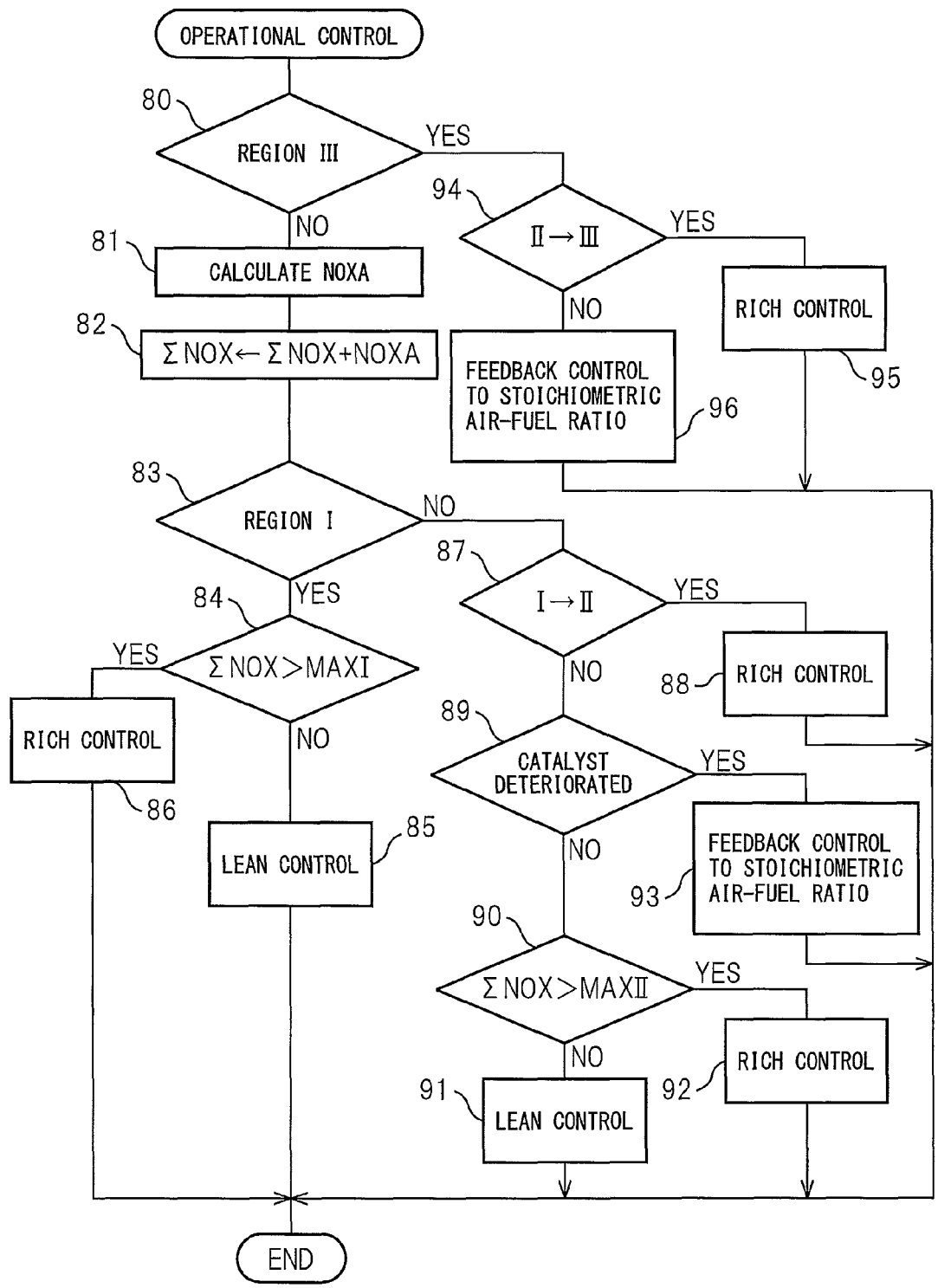
FIG. 20 is a flow chart for control of engine operation.

FIG. 20 shows the operational control routine. This routine is executed by interruption every predetermined time. Referring to FIG. 20, first, at step 80, it is judged if the operating state of the engine is the engine high load operating region III which is shown in FIG. 18. When the operating state of the engine is not the engine high load operating region III, the routine proceeds to step 81 where the $NO_x$ amount NOXA exhausted per unit time is calculated from the map which is shown in FIG. 6. Next, at step 82, the exhausted $NO_x$ amount NOXA is added to ΣNOX whereby the stored $NO_x$ amount ΣNOX is calculated. Next, at step 83, it is judged if the operating state of the engine is the engine low load operating region I which is shown in FIG. 18. When the operating state of the engine is the engine low load operating region I which is shown in FIG. 18, the routine proceeds to step 84.

At step 84, it is judged whether the $NO_x$ storage amount ΣNOX exceeds the first allowable $NO_x$ storage amount MAXI. When the $NO_x$ storage amount ΣNOX does not exceed the first allowable $NO_x$ storage amount MAXI, the routine proceeds to step 85 where the air-fuel ratio in the combustion chamber 5 is made a predetermined lean air-fuel ratio in accordance with the operating state of the engine. At this time, a combustion is performed under a lean base air-fuel ratio. As opposed to this, at step 84, when it is judged that the $NO_x$ storage amount ΣNOX exceeds the first allowable $NO_x$ storage amount MAXI, the routine proceeds to step 86 where the air-fuel ratio in the combustion chamber 5 is temporarily made rich and ΣNOX is cleared. At this time, the $NO_x$ which is stored at the $NO_x$ storage catalyst 22 is released from the $NO_x$ storage catalyst 22.

On the other hand, when it is judged at step 83 that the operating state of the engine is not the engine low load operating region I which is shown in FIG. 18, that is, when it is judged that the operating state of the engine is the engine medium load operating region II which is shown in FIG. 18, the routine proceeds to step 87 where it is judged if the operating state of the engine has now shifted from the engine low load operating region I to the engine medium load operating region II. When the operating state of the engine has now shifted from the engine low load operating region I to the engine medium load operating region II, the routine proceeds to step 88 where the air-fuel ratio in the combustion chamber 5 is temporarily made rich. As opposed to this, when the operating state of the engine has already shifted from the engine low load operating region I to the engine medium load operating region, the routine proceeds to step 89.

At step 89, it is judged if the $NO_x$ selective reduction catalyst 23 is deteriorated. In this case, for example, when the traveled distance of the vehicle exceeds a predetermined distance, it is judged that the $NO_x$ selective reduction catalyst 23 is deteriorated. At step 89, when it is judged that the $NO_x$ selective reduction catalyst 23 is not deteriorated, the routine proceeds to step 90 where it is judged if the $NO_x$ storage amount ΣNOX exceeds the second allowable $NO_x$ storage amount MAXII. When the $NO_x$ storage amount ΣNOX does not exceed the second allowable $NO_x$ storage amount MAXII, the routine proceeds to step 91 where the air-fuel ratio in the combustion chamber 5 is made a predetermined lean air-fuel ratio in accordance with the operating state of the engine. At this time, a combustion is performed under a lean base air-fuel ratio. Note that the base air-fuel ratio at this time is smaller than the base air-fuel ratio at the engine low load operating region I.

As opposed to this, when at step 90 it is judged that the $NO_x$ storage amount ΣNOX exceeds the second allowable $NO_x$ storage amount MAXII, the routine proceeds to step 92 where the air-fuel ratio in the combustion chamber 5 is temporarily made rich and ΣNOX is cleared. At this time, the $NO_x$ which is stored at the $NO_x$ storage catalyst 22 is released from the $NO_x$ storage catalyst 22. On the other hand, when it is judged at step 89 that the $NO_x$ selective reduction catalyst 23 is deteriorated, It is no longer possible to perform the action of removal of $NO_x$ using the adsorption of ammonia at the $NO_x$ selective reduction catalyst 23. Therefore, at this time, the routine proceeds to step 93 where the air-fuel ratio in the combustion chamber 5 is feedback controlled to the stoichiometric air-fuel ratio.

On the other hand, when at step 80 it is judged that the operating state of the engine is the engine high load operating region III which is shown in FIG. 18, the routine proceeds to step 94 where it is judged if the operating state of the engine has now shifted from the engine medium load operating region II to the engine high load operating region III. When the operating state of the engine has now shifted from the engine medium load operating region II to the engine high load operating region III, the routine proceeds to step 95 where the air-fuel ratio in the combustion chamber 5 is temporarily made rich. As opposed to this, when the operating state of the engine has already shifted from the engine medium load operating region II to the engine high load operating region III, the routine proceeds to step 96. At step 96, the air-fuel ratio in the combustion chamber 5 is feedback controlled to the stoichiometric air-fuel ratio.

REFERENCE SIGNS LIST

5 combustion chamber
6 spark plug
11, 12 fuel injector
14 surge tank
19 exhaust manifold
20 three-way catalyst
22 $NO_x$ storage catalyst
23 $NO_x$ selective reduction catalyst

The invention claimed is:

1. An exhaust purification system of a spark ignition type internal combustion engine, the exhaust purification system comprising:
    an engine exhaust passage;
    an $NO_x$ storage catalyst that is arranged in the engine exhaust passage, the $NO_x$ storage catalyst storing $NO_x$ in exhaust gas when an air-fuel ratio of an inflowing exhaust gas is lean, and releasing stored $NO_x$ when the air-fuel ratio of the inflowing exhaust gas is made rich;
    an $NO_x$ selective reduction catalyst that is arranged in the engine exhaust passage downstream of the $NO_x$ storage catalyst; and
    an electronic control unit having control logic configured to cause the electronic control unit to control the exhaust purification system, the electronic control unit being configured to:
        calculate the $NO_x$ storage amount that is stored in the $NO_x$ storage catalyst;
        when the $NO_x$ storage amount exceeds a predetermined first allowable $NO_x$ storage amount and an engine load is lowered, cause an air-fuel ratio in a combustion chamber to be made rich; and
        when the $NO_x$ storage amount exceeds a predetermined second allowable $NO_x$ storage amount and the engine load is higher as compared with a time when the engine load is lowered, cause: (i) the air-fuel ratio in the combustion chamber to be made rich, and (ii) the predetermined second allowable $NO_x$ amount to be made a value smaller than the first allowable $NO_x$ storage amount, (iii) the base air-fuel ratio to be made smaller, (iv) the degree of richness of the air-fuel ratio in the combustion chamber to be made smaller, and (v) a time period during which the air-fuel ratio in the combustion chamber is made rich to be shorter, such that an amount of ammonia that is produced per unit time when the air-fuel ratio in the combustion chamber is made rich is lower compared to the amount of ammonia that is produced per unit time when the engine load is lowered, wherein:
            ammonia that is produced at the $NO_x$ storage catalyst when the air-fuel ratio of the inflowing exhaust gas is made rich is adsorbed at the $NO_x$ selective reduction catalyst, and $NO_x$ in the exhaust gas is reduced by the ammonia which is adsorbed at the $NO_x$ selective reduction catalyst; and when the engine load is lowered, a combustion is performed in the combustion chamber in a state where a base air-fuel ratio is lean and the air-fuel ratio in the combustion chamber is made rich when $NO_x$ should be released from the $NO_x$ storage catalyst.

2. The exhaust purification system of a spark ignition type internal combustion engine as claimed in claim 1, wherein the electronic control unit is configured to:

judge whether the $NO_x$ selective reduction catalyst is deteriorated; and when the electronic control unit judges that the $NO_x$ selective reduction catalyst is deteriorated, feedback control the air-fuel ratio in the combustion chamber to be equal to the stoichiometric air-fuel ratio when the engine load is higher as compared with the time when the engine load is lowered.

3. The exhaust purification system of a spark ignition type internal combustion engine as claimed in claim 1, wherein the $NO_x$ storage catalyst includes a catalyst carrier that carries a precious metal catalyst; and the catalyst carrier is formed with a basicity layer that includes at least one element selected from a group consisting of the following elements: potassium K; sodium Na; cesium Cs; barium Ba; calcium Ca; lanthanoids; silver Ag; copper Cu; iron Fe; and iridium Ir.

* * * * *